United States Patent
Pines et al.

(10) Patent No.: US 7,991,140 B2
(45) Date of Patent: **\*Aug. 2, 2011**

(54) ENHANCED DIRECTORY ASSISTANCE SYSTEM

(75) Inventors: Robert Pines, New York, NY (US); Christine Baumeister, Harleysville, PA (US); John Blakeney, Macungie, PA (US)

(73) Assignee: Grape Technology Group, Inc., Bethlehem, PA (US)

( * ) Notice: Subject to any disclaimer, the term of this patent is extended or adjusted under 35 U.S.C. 154(b) by 1222 days.

This patent is subject to a terminal disclaimer.

(21) Appl. No.: 11/589,292

(22) Filed: Oct. 27, 2006

(65) Prior Publication Data

US 2007/0165822 A1    Jul. 19, 2007

Related U.S. Application Data

(63) Continuation of application No. 10/380,868, filed as application No. PCT/US01/29116 on Sep. 17, 2001, now Pat. No. 7,130,406.

(60) Provisional application No. 60/233,158, filed on Sep. 15, 2000.

(51) Int. Cl.
    *H04M 3/493* (2006.01)

(52) U.S. Cl. .................. 379/218.01; 455/456.3

(58) Field of Classification Search ............ 379/218.01, 379/218.02; 455/414.1, 414.3, 456.1, 456.3; 705/14.4, 14.49
    See application file for complete search history.

(56) References Cited

U.S. PATENT DOCUMENTS

| | | | |
|---|---|---|---|
| 4,742,357 A | 5/1988 | Rackley | |
| 5,299,132 A | 3/1994 | Wortham | 455/457 |
| 5,485,163 A | 1/1996 | Singer et al. | 342/457 |
| 5,737,700 A | 4/1998 | Cox et al. | |
| 5,797,092 A | 8/1998 | Cox et al. | |
| 5,850,433 A | 12/1998 | Rondeau | |
| 5,852,775 A | 12/1998 | Hidary | |
| 5,873,032 A | 2/1999 | Cox et al. | |
| 5,873,040 A | 2/1999 | Dunn et al. | 455/456 |
| 5,940,483 A | 8/1999 | Shaffer et al. | |
| 5,943,417 A | 8/1999 | Cox et al. | |
| 5,946,618 A | 8/1999 | Agre et al. | 455/428 |
| 5,946,619 A | 8/1999 | Kolev | 455/432.1 |
| 5,946,626 A | 8/1999 | Foladare et al. | 455/456.1 |

(Continued)

FOREIGN PATENT DOCUMENTS

WO    WO0019742    4/2000

(Continued)

OTHER PUBLICATIONS

International Search Report dated Feb. 2, 2002.

*Primary Examiner* — Harry S Hong
(74) *Attorney, Agent, or Firm* — Sofer & Haroun, LLP

(57) ABSTRACT

An enhanced directory assistance system includes a telephone switch for receiving calls from at least one caller desiring to receive directions. A direction module is configured to receive a desired destination information provided by the caller and the location of the caller. The direction module is further configured to provide directions to the caller based on the destination and the caller location information, where the system maintains a preferred destination listing configured to store a preferred destination information relating to a destination request frequently requested by the caller, such that when the system recognizes the caller, the desired destination is populated directly from the preferred destination information.

20 Claims, 17 Drawing Sheets

U.S. PATENT DOCUMENTS

| | | | |
|---|---|---|---|
| 5,950,123 A | 9/1999 | Schwelb et al. | 455/414.4 |
| 5,966,437 A | 10/1999 | Cox et al. | |
| 5,987,471 A | 11/1999 | Bodine et al. | |
| 5,995,826 A | 11/1999 | Cox et al. | |
| 6,002,932 A | 12/1999 | Kingdon et al. | 455/456.5 |
| 6,009,323 A | 12/1999 | Heffield et al. | |
| 6,009,333 A | 12/1999 | Chaco | 455/456.2 |
| 6,019,069 A | 2/2000 | Joyce | 122/18.31 |
| 6,026,304 A | 2/2000 | Hilsenrath et al. | 455/456.2 |
| 6,026,305 A | 2/2000 | Salinger et al. | 455/456 |
| 6,035,190 A | 3/2000 | Cox et al. | |
| 6,035,198 A | 3/2000 | Wiehe | 455/445 |
| 6,049,711 A | 4/2000 | Ben-Yehezkel et al. | 455/414 |
| 6,058,179 A | 5/2000 | Shaffer et al. | 379/220.01 |
| 6,064,874 A | 5/2000 | Cox et al. | |
| 6,075,993 A | 6/2000 | Kawamoto | 455/456 |
| 6,108,646 A | 8/2000 | Mohri et al. | |
| 6,169,754 B1 | 1/2001 | Sugawara et al. | |
| 6,256,515 B1 | 7/2001 | Cox et al. | |
| 6,269,337 B1 | 7/2001 | Desmond et al. | |
| 6,320,943 B1 | 11/2001 | Borland | |
| 6,321,158 B1 | 11/2001 | DeLorme et al. | |
| 6,459,782 B1 | 10/2002 | Bedrosian et al. | |
| 6,580,904 B2 | 6/2003 | Cox et al. | |
| 6,658,389 B1 | 12/2003 | Alpdemir | |
| 6,674,849 B1 | 1/2004 | Froeberg | |
| 6,775,371 B2 | 8/2004 | Elsey et al. | |
| 6,813,502 B2 | 11/2004 | Son et al. | 455/456.3 |
| 6,934,684 B2 | 8/2005 | Alpdemir | |
| 7,130,406 B2 * | 10/2006 | Pines et al. | 379/218.01 |
| 2001/0012772 A1 | 8/2001 | Cox et al. | |
| 2001/0012773 A1 | 8/2001 | Cox et al. | |
| 2001/0014598 A1 | 8/2001 | Cox et al. | |
| 2001/0043697 A1 | 11/2001 | Cox et al. | |
| 2001/0044325 A1 | 11/2001 | Cox et al. | |
| 2002/0004382 A1 | 1/2002 | Cox et al. | |
| 2002/0013141 A1 | 1/2002 | Cox et al. | |
| 2002/0035474 A1 | 3/2002 | Alpdemir | |
| 2002/0055852 A1 | 5/2002 | Little et al. | |
| 2002/0193938 A1 | 12/2002 | DeKock et al. | |
| 2004/0076279 A1 * | 4/2004 | Taschereau | 379/218.01 |

FOREIGN PATENT DOCUMENTS

| WO | WO-0035216 | 6/2000 |
|---|---|---|

* cited by examiner

FIGURE 6

Incoming Caller Identification Record 70

| Number Dialed by Caller | Preferred Language Code Field | Originating Phone Number of Caller | Caller Service Provider Field | Feature Code | Location of Caller |
|---|---|---|---|---|---|
| | | | | | |

FIGURE 7

DIRECTIONS PACKET 50

| | |
|---|---|
| 54 | Originating Phone Number of Caller Field |
| 56 | Directions/Mapping Field |
| 58 | Advertising Prompt Code Field |
| 57 | Traffic Field |

FIGURE 8

DIRECTIONS AND MAPPING DATABASE TABLE 72

| Name or Identifier |
| --- |
| Location (Geo) - code |
| Address: |
|     Street 1 |
|     Street 2 |
|     City |
|     State |
|     Zip |
|     Zip + 4 |
|     Country |
| Mapping Code |

FIGURE 9

LISTING TABLE 52A

| Calling Phone Number | |
|---|---|
| Name | Special Features Code |
| Directory Listed Name | Type of Data Field |
| Address: | Data Source |
| Street 1 | NPA/NXX Wireless |
| Street 2 | Device Capability |
| City | WAP |
| State | SMS |
| Zip | i-Mode |
| Zip + 4 | Other |
| Country | License Plate |
| Defined Locality | Rate Plan |
| Wireline Phone Number | Recent Destination |
| Email Address | Alternate Destination |
| Company | Preferred Destination |
| Wireless Carrier | |
| Billing Info | |
| | |
| | |
| | |
| | |

FIGURE 10

RECENT, ALTERNATE AND PREFERRED DESTINATION SUB-LISTING

| CUSTOMER ANI | PASSWORD |
|---|---|
| Recent Destinations | Alternate Destinations |
| FROM Address: | FROM Address: |
| Street 1 | Street 1 |
| Street 2 | Street 2 |
| City | City |
| State | State |
| Zip | Zip |
| Zip + 4 | Zip + 4 |
| Country | Country |
| TO Address: | TO Address: |
| Street 1 | Street 1 |
| Street 2 | Street 2 |
| City | City |
| State | State |
| Zip | Zip |
| Zip + 4 | Zip + 4 |
| Country | Country |
| | |
| Preferred Destinations | |
| FROM Address: | |
| Street 1 | |
| Street 2 | |
| City | |
| State | |
| Zip | |
| Zip + 4 | |
| Country | |
| TO Address: | |
| Street 1 | |
| Street 2 | |
| City | |
| State | |
| Zip | |
| Zip + 4 | |
| Country | |
| | |

FIGURE 11

ADVERTISING LOCATION BUSINESS MODULE TABLE 80

| Business Name | |
|---|---|
| Address | |
| Street 1 | |
| Street 2 | |
| City | |
| State | |
| Zip | |
| Zip + 4 | |
| Country | |
| Lat/Long | |
| | |
| Business Type | |
| SIC Codes | |
| Custom | |
| | |
| Relationship Status | |
| | |
| Location Parameters | |
| Geographic Location | |
| Specified Routes | |
| | |
| | |
| Advertising Parameters | |
| Time of Day | |
| Day of Week | |
| Distance Radius | |
| Geographic Location | |
| Specified Routes | |
| Customer Type | |

Advertising Prompt Module 27

FIGURE 13

DIRECTIONS DATA TABLE 98

- Number Dialed by Caller 60A

- Type of Data 60 B

- Directions Requested 60 C

- Preferred Language 60 D

- Other data 60 E

ENHANCED DIRECTORY ASSISTANCE SYSTEM

RELATED APPLICATIONS

This application is a continuation application of allowed U.S. patent application Ser. No. 10/380,868, filed on Mar. 14, 2003, now U.S. Pat. No. 7,130,406 which is a National Phase Application of PCT Patent Application No. PCT/US01/29116, filed Sep. 17, 2001 which in turn claims the benefit of priority from U.S. Provisional Application No. 60/233,158, filed on Sep. 15, 2000 entitled "Enhanced Directory Assistance System," the entirety of which are incorporated herein by reference.

FIELD OF THE INVENTION

The present invention is directed to a system and method, which allows a caller to contact an enhanced directory assistance system so as to obtain directions. In particular, the present invention is directed to a system and method which provides direction services for wireless apparatus callers.

BACKGROUND OF THE INVENTION

In the area of travel directions there exists a need for improving the current systems for individuals requesting directions to gather or receive information to assist them in reaching their ultimate destination. One such method is through the use of maps, where a user locates their own position and their destination and attempts to navigate themselves by using the designations on the map. However, significant drawbacks are associated with this method because often, when an individual is attempting to use a map their own exact location is not precisely known, leading to difficulties in properly utilizing the map.

Additionally, improvements in direction systems have improved with the advent of the Global Positioning System (GPS) and triangulation which are able to locate the exact position of an individual bearing the proper equipment. However, such GPS systems are costly and bulky. The present invention looks to improve on the current methods of direction information by providing an enhanced directory assistance system where a caller can connect to a directory service and give the name of the destination, and within a short time the directions will be relayed to the caller by one of several means predicated on the caller's device capabilities or alternatively on the user's preference.

SUMMARY OF THE INVENTION

The present invention provides for an enhanced directory assistance system configured to provide directions information to a plurality of callers. The system comprises a telephone switch for receiving calls from a plurality of callers desiring to receive directions. The system further comprises an automatic location system configured to provide the location from the callers during a call session to the telephone switch.

An enhanced services direction module is provided, configured to receive destination and starting location information provided by the caller and further configured to provide directions to the caller based on the provided information.

In one embodiment of the present invention the system further comprises a mapping and directions database coupled to the enhanced service directions module configured to store information used to prepare directions. The mapping and directions database may be located geographically remote from the enhanced directory assistance system.

In one embodiment of the present invention the system further comprises of an agent application configured to provide a directions packet formed by the enhanced service direction module to the telephone switch.

In one embodiment of the present invention the system further comprises of a traffic database coupled to said enhanced services direction module configured to provide traffic information corresponding to a route desired by each of said callers. The system may also include a traffic vendor coupled to the traffic database configured to provide the traffic database with updated traffic information for the geographical area covered by the system.

In one embodiment of the present invention the system further comprises an advertising prompt module configured to generate an advertising prompt code corresponding to an advertising content provided to a plurality of the callers. The system may also comprise an advertising database coupled to the advertising prompt module configured to store the advertising content. Possible formats for the advertising content include voice messages and multimedia messages.

BRIEF DESCRIPTION OF THE DRAWINGS

For the purpose of illustrating the invention, there are shown in the drawings several forms, which are presently preferred, it being understood, however, that the invention is not limited to the precise arrangements and instrumentalities shown.

FIG. 6 illustrates an incoming caller information record, in accordance with one embodiment of the present invention.

FIG. 7 illustrates a directions packet, in accordance with one embodiment of the present invention.

FIG. 8 illustrates a directions and mapping database table, in accordance with one embodiment of the present invention.

FIG. 9 illustrates customer database listing table, in accordance with one embodiment of the present invention.

FIG. 10 illustrates a recent, alternative and preferred destination sub-listing, in accordance with one embodiment of the present invention.

FIG. 11 illustrates an advertisement location business modification table, in accordance with one embodiment of the present invention.

FIG. 13 illustrates an advertisement data table, in accordance with one embodiment of the present invention.

DETAILED DESCRIPTION OF THE PREFERRED EMBODIMENTS

Figure 1:
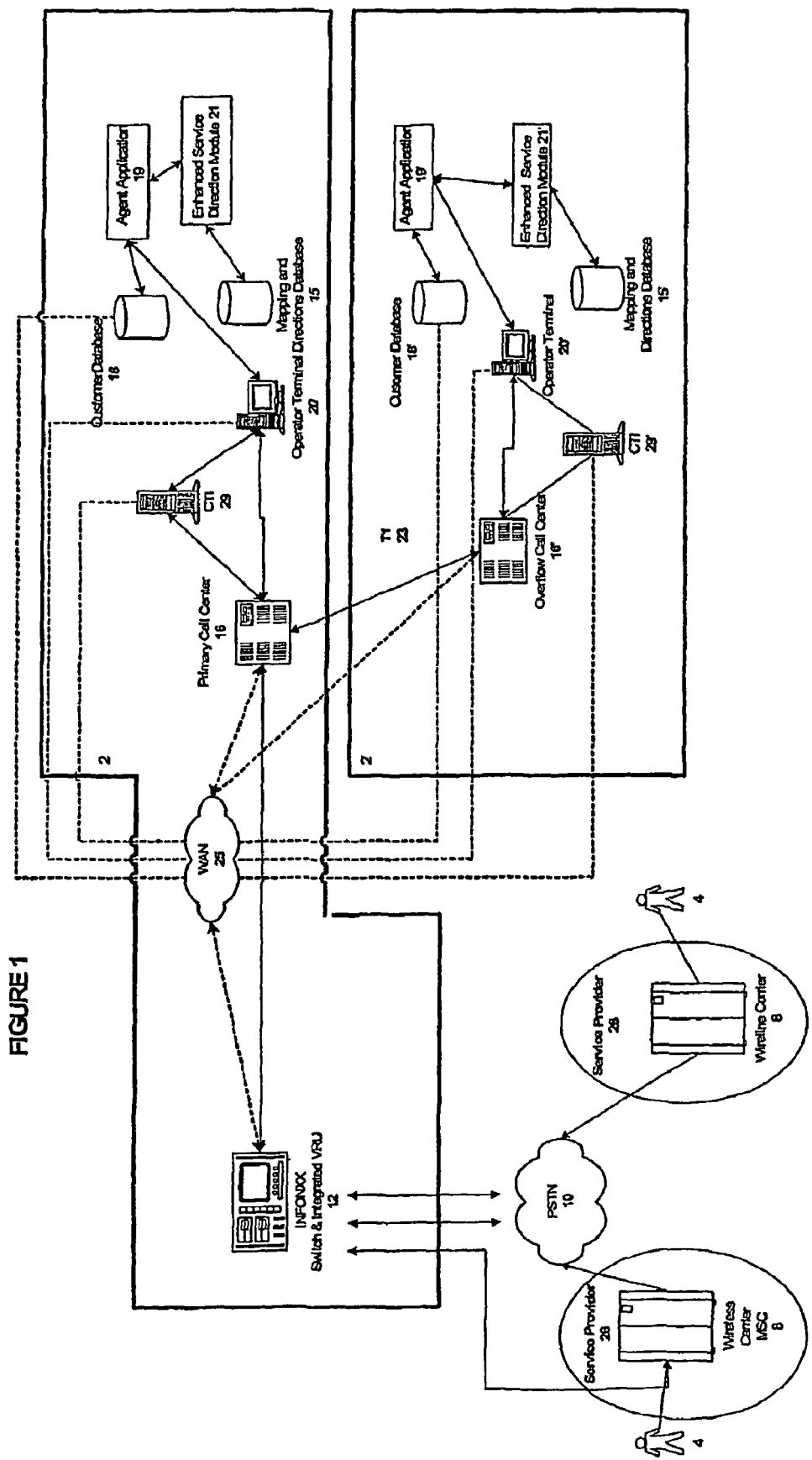
FIG. 1 illustrates an enhanced directory assistance system architecture, in accordance with one embodiment of the present invention.

Referring now to the drawings, wherein like reference numerals refer to like elements, there is shown in FIG. 1, an enhanced directory assistance system 2 in accordance with one embodiment of the present invention. System 2 allows a caller 4 to request and receive directions to a desired location. Caller 4 can access system 2 via a traditional wireline Local Exchange Carrier (LEC) and/or Inter-Exchange Carrier, via a wireless carrier (including both voice and data access) or via connection to the Internet.

In the present invention callers 4 can access system 2 via directory assistance dial strings, such as (411, 555-1212, NPA-55-1212). However, it is contemplated that callers 4 could use any designated dial string to access system 2. The ANI (Automatic Number Identification) is passed from system 2 it can be collected by the customer service representative. The service provided by system 2 may be available 24 hours a day seven days a week.

It should be noted that although caller 4 can access system 2 via land carriers many of the features discussed below refer to the function of system 2 in conjunction with a caller 4 who is operating from a wireless apparatus. For the purposes of illustration, caller 4 will be presumed to be operating from a wireless device unless it is otherwise indicated, however this is in no way intended to limit the scope of the present invention. Any system and method which caller 4 uses to contact system 2 which can maintain the necessary functionalities required to transmit/receive directions is within the contemplation of the present invention. Wireless apparatuses used by caller 4 can be any known wireless communication device including cellular telephones and modems, pagers, PCS phones and modems, RIM Blackberry, wireless PDAs, instant messaging devices, SMS devices and the like. In addition, it is contemplated that the present invention can be implemented to accommodate any device including, for example, a Personal Digital Assistant (PDA) with voice and/or data communication capability, etc.

System 2 is preferably coupled to one or more service providers 26 directly through the wireless MSC (Mobile Switching Center) 8 or via public switched telephone network (PSTN) 10.

In general, caller 4 communicates with System 2 via mobile switching center (MSC)s 8 as shown in FIG. 1. It is also contemplated that caller 4 can communicate with system 2 via MSC 8 coupled to PSTN 10. Similarly, caller 4 can communicate with system 2 via MSC 8 directly coupled to system 2, i.e., without the need to communicate via PSTN 10.

Alternate means of caller 4 accessing system 2 are described fully in Applicant's related co-pending application serial No. PCT/US01/02366 filed on Jan. 24, 2001, the entirety of which is incorporated herein by reference.

Figure 2:
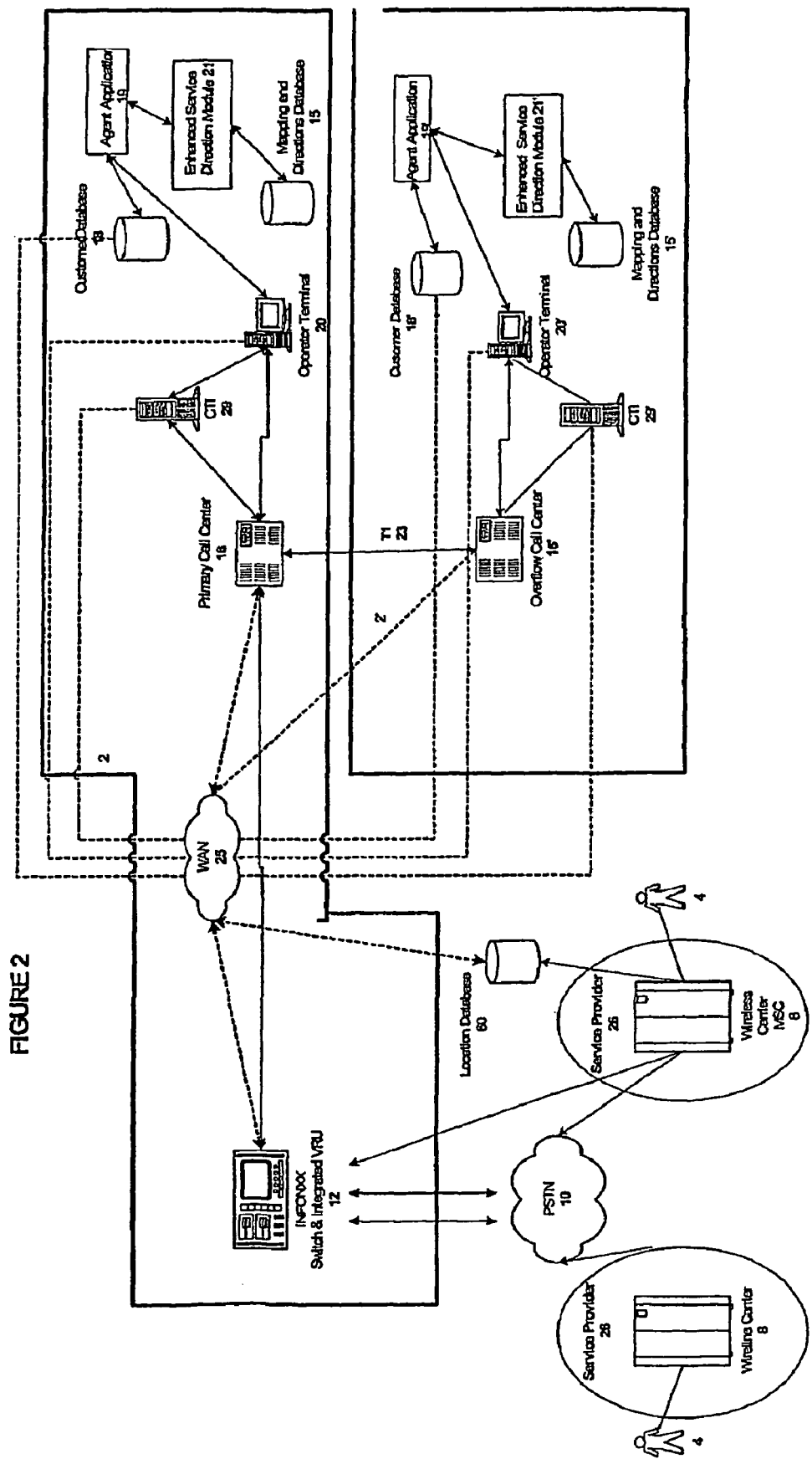
FIG. 2 illustrates an enhanced directory assistance system architecture, in accordance with another embodiment of the present invention.

As shown in FIG. 1, system 2 is preferably comprised of one or more switches and integrated voice response units (VRU) 12 (the VRU may be standalone instead of integrated), primary call centers 16, caller or customer listing databases 18, a plurality of operator terminals 20 running agent application 19 accessing enhanced service direction module 21 that may be automated or operated by an agent, a mapping and directions database 15 coupled to enhanced service directions module 21, a wide area network 25, a computer telephony interfaces 29, and T1 telephone lines 23. In another embodiment of the present invention, as illustrated in FIG. 2, the architecture of system 2 may further include a locations database 60 coupled to Wide Area Network (WAN) 25, so as to provide the location of caller 4, when caller 4 has accessed directory assistance system 2. Although not shown, it is also contemplated that location of caller 4 could be provided for calls that originate with Wireline carrier 8.

Figure 3:
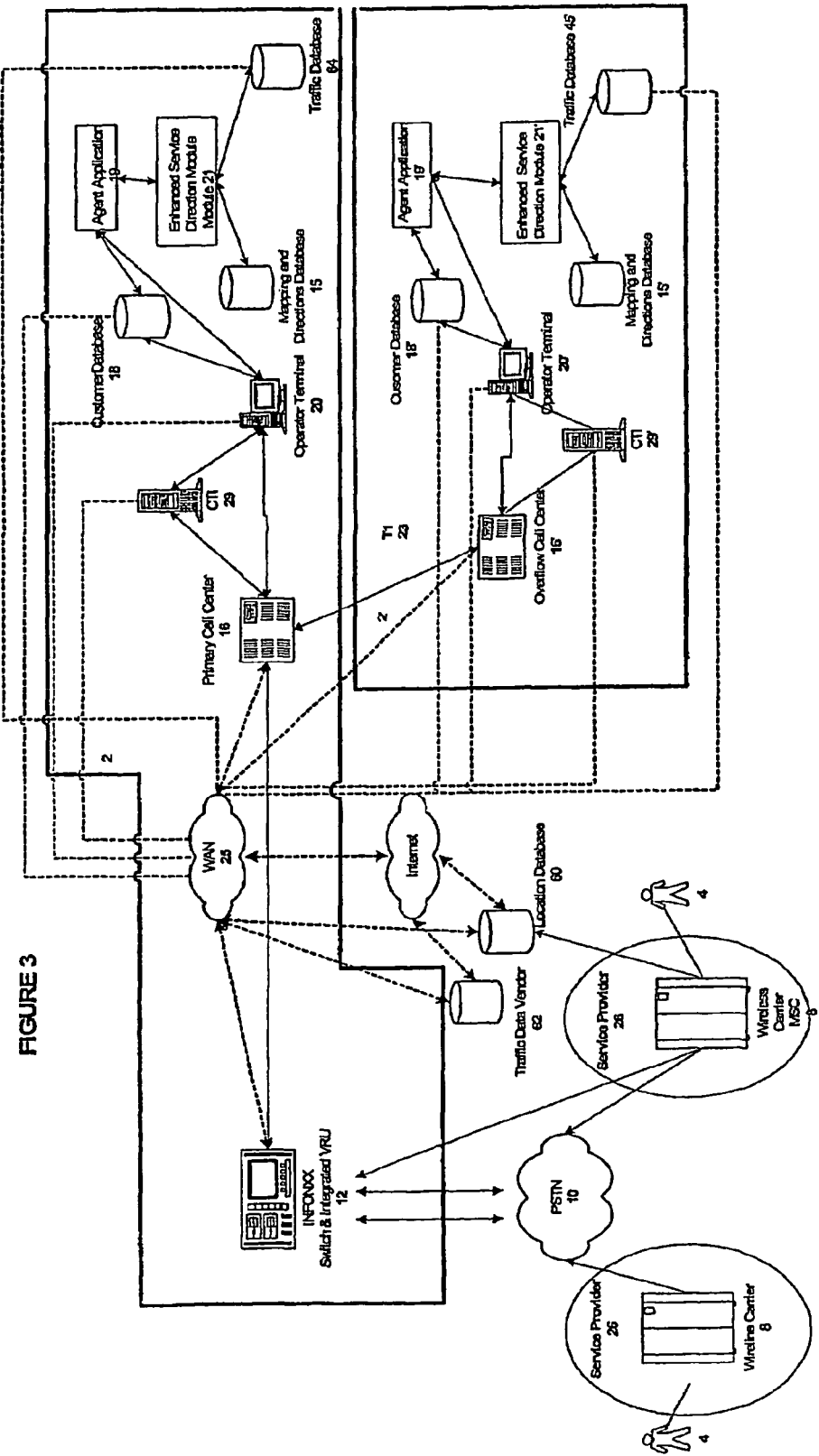
FIG. 3 illustrates an enhanced directory assistance system architecture, in accordance with another embodiment of the present invention.

In another embodiment of the present invention, as illustrated in FIG. 3, the architecture of system 2 may further include location database 60 and traffic vendor module 43 both coupled to WAN 25 both directly and via the Internet (both connections pictured). System 2 may also maintain a traffic database 45 coupled to enhanced service directions module 21.

Figure 4:
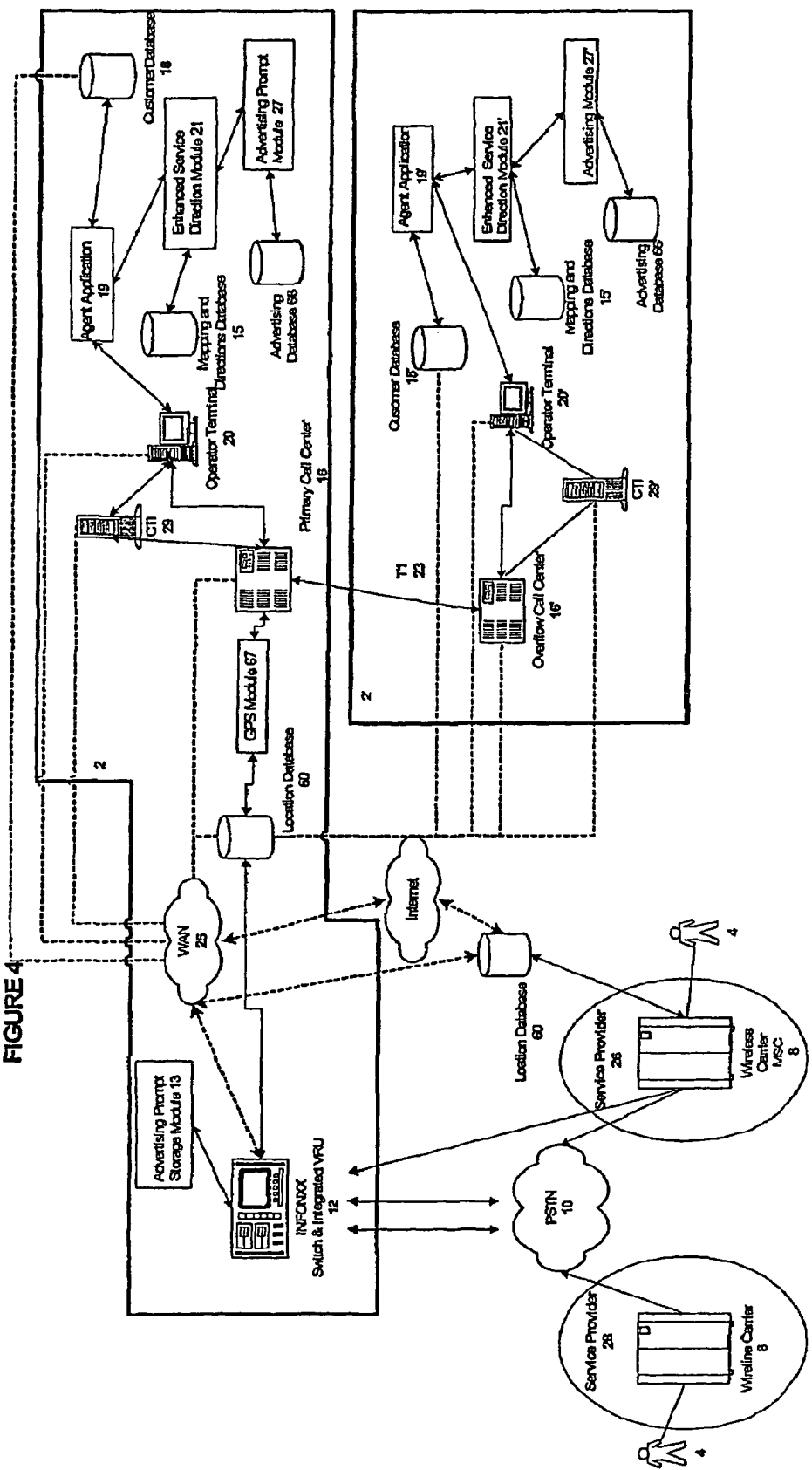
FIG. 4 illustrates an enhanced directory assistance system architecture, in accordance with another embodiment of the present invention.

In another embodiment of the present invention as illustrated in FIG. 4, the architecture of system 2 may further include an advertising prompt module 27 coupled to enhanced services direction module 21. Advertising prompt module 27 is also connected to an advertising database 66 configured to store advertiser information. Enhanced service direction module 21 may also access certain advertising prompt information from customer database 18 as discussed below. An advertising prompt storage module 13 is attached to VRU/switch 12 in order to store advertising prompts for switch 12, such that switch 12 can access the appropriate advertisement prompt based on instructions provided by advertising prompt module 27 and enhanced services directions module 21.

Figure 5:
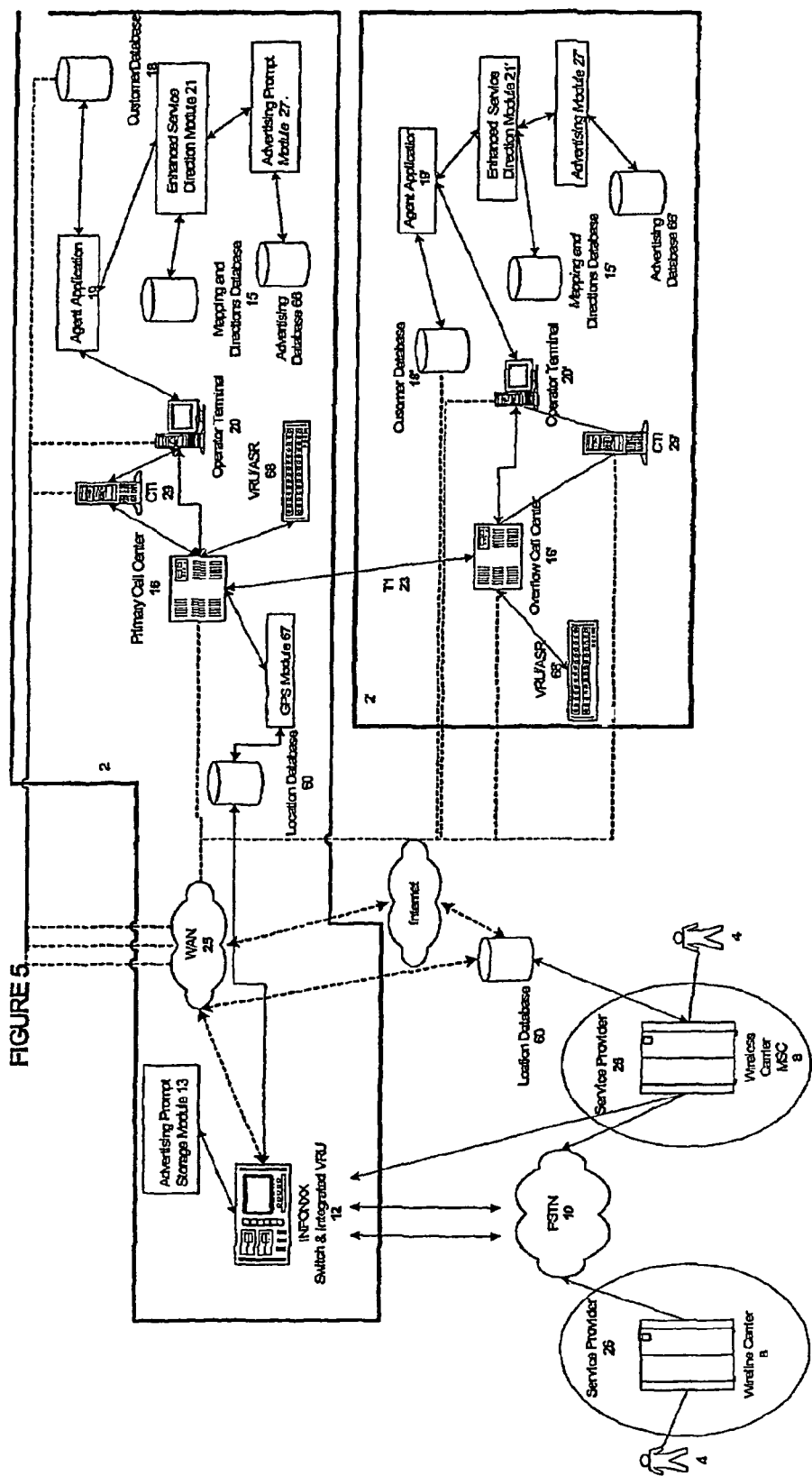
FIG. 5 illustrates an enhanced directory assistance system architecture, in accordance with another embodiment of the present invention.

In this configuration, with the additional advertising functions, location database 60 is connected to WAN 25 both directly and via the Internet as illustrated in FIG. 4. Alternatively, location database 60 can be simply directly connected to WAN 25, as illustrated in FIG. 5. As shown in both FIG. 4 and FIG. 5, in another embodiment of the present invention, location database 60 may also reside within system 2 when coupled with GPS module 67.

In another embodiment of the present invention as illustrated in FIG. 5, the architecture of system 2 may further include an VRU/ASR 68 (Voice Response Unit/Advanced Speech Recognition) module coupled to primary call center 16. This VRU/ASR 68 is configured to provide a stand alone voice response unit separate from switch 12. This feature is simply illustrated to show an alternate means for system 2 to both deliver advertising prompts and receive caller 4 commands in a manner not involving integrated switch/VRU components. In this configuration system 2 may be able to provide more flexibility to the capabilities of system 2 in terms of prompt delivery and taking caller 4 instructions. However this is in no way intended to limit the scope of the present invention. Any similar enhanced directory assistance system which utilizes a VRU and/or an ASR in conjunction with providing directions, regardless of whether or not the components are integrated with a telephony switch or not, is within the contemplation of the present invention. For the purposes of illustration the VRU functionality will be assumed to be present in integrated switch/VRU 12.

It should be noted that various data source components of system 2 such as location database 60, traffic vendor 62, traffic database 64 and advertising database 66 may be located either centrally or remotely in accordance with various embodiments of the invention. The salient features of these modules are based for the most part in their operation, functionality, connection and interaction with the various other modules of system 2. Their physical location is intended only to illustrate one embodiment of the present invention. For example, it is within the contemplation of the present invention to outsource advertising database 66, and in such a case it would be alternatively located remotely. Likewise, it is within the contemplation of the present invention that, location database 60 may be maintained centrally.

Switches 12 are coupled to mobile switching centers (MSCs) 8 and PSTN 10 as well as primary call center 16. Primary call center 16 is also coupled to at least one operator terminal 20 and customer database 18. Although not shown, it is within the contemplation of this invention that System 2' may contain a Switch 12' that would be connected to call centers 16'. Also, although only one switch 12 is illustrated in FIGS. 1-5 any number of switches 12 can be used in system 2 to increase the capacity of system 2.

The connection between primary call center 16 and operator terminal 20 is such that voice communication is transmitted directly between the two and data information is transmitted via computer telephony interface 29. This may also be accomplished via in-band signaling, as will be discussed below. Operator terminal 20 is not only connected to customer database 18 but also to other databases and software application modules as well.

It should be noted that the hardware configurations illustrated in FIGS. 1-5 represent one embodiment of the present invention, however, other hardware architectures are within the contemplation of the present invention. For example, primary call center 16 can be coupled to PSTN 10 for backup call routing via PSTN 10. Any hardware configuration which maintains similar modules and provides similar enhanced directory assistance services is within the contemplation of the present invention.

In a preferred embodiment of the present invention a plurality of call centers such as system 2 and system 2', illustrated in FIGS. 1-5, can be strategically located in various geographic locations across the country. For example, each call center, system 2 or System 2' can be located in a major metropolitan area spread across the United States. Each call center is configured to handle the call traffic that is designated for that call center which could include all possible types of calls.

Additionally, as reflected in FIG. 2, each system 2 or 2' can be connected to other call centers, such that all of the Systems 2 or 2' are connected. This connection can be achieved by the coupling of primary call centers 16 of the various systems 2 via high capacity telephone cables such as T1 lines 23, WAN 25 or other comparable facilities including PSTN 10. It is also in the contemplation of this invention that these connections could be established through the use of a virtual private network (VPN) or other comparable technology.

In operation, primary call center 16' receives forwarded calls from primary call center 16 in the case where system 2 is experiencing operational problems or a volume of requests that exceed its capacity. An important benefit provided by this arrangement is that the primary call center 16' of system 2' is able to act as an overflow unit for primary call center 16 of system 2 in the event that system 2 is experiencing technical difficulties or high call volume. This configuration allows primary call center 16 to route calls to primary call center 16' during periods of high volume, even in the event of a breakdown in the primary direct connections of system 2 is described above.

Customer database 18, mapping and directions database 15, advertising database 66 and customer database 18', mapping and directions database 15' and advertising database 66' are similarly arranged, and are preferably mirror images of one another. Although operator terminal 20 is not shown directly coupled to primary call center 16' and customer database 18', operator terminals 20 can be so coupled via WAN 25, or can access call center 16' and databases 15', 18' and 66' via primary call center 16 as shown in FIGS. 1-5. This overcomes situations where databases 15, 18 or 66 are down in system 2, such that operator terminal 20 completes the call using information stored on databases 15', 18' or 66' as appropriate.

This arrangement, for interconnecting all of the systems 2 and 2', also allows for time shifting benefits such that some localities when experiencing low caller traffic can close for the evening allowing a system 2' located in an earlier time zone to handle the calls. For example, a call center system 2 in New York could close between the hours of 2 am and 6 am, and allow a call center system 2' in California or Hawaii to handle the calls. Not only does this allow for time shift, but it also allows for employment/staffing advantages by allowing the administrators of the service to hire personnel in areas where the conditions are most advantageous. For example, a call center system 2 on the east coast can route a significant portion of its call traffic to a Midwest call center system 2' located in an area where it is easier to staff and train the required number of employees.

The links coupling the various components of system 2 together with service providers 26 via mobile switching center (MSC) 8 and Public Switched Telephone Network (PSTN) 10 can be any known voice and/or data communication technologies, including wide area networking and local area networking communication technologies, for example, digital subscriber lines (DSL), digital T-1s 23 (as pictured in FIG. 1-5), leased lines, satellite or wireless links, Integrated Services Digital Network (ISDN) circuits, asynchronous transfer mode (ATM), Ethernet, token ring, fiber distributed-data interface (FDDI) and the like. It is also presumed that the various components of system 2, service providers 26 and PSTN 10 are arranged with appropriate communication hardware interfaces to transmit and receive data across the communication links. For example, wireless service providers 26 may interface directly with system 2 via mobile switching center (MSC) 8 hardware coupled directly to switch 12 of system 2.

Switches 12 can be any switches that preferably include an integrated voice response unit. Many functions performed by switches 12 are known to those of ordinary skill in the art and include telephone call routing between trunks, converting one signaling type to another, such as between a digital signaling system, dual-tone multi-frequency (DTMF) signaling, multi-frequency (MF) signaling, ISDN, SS7, etc., and capturing call length and destination data for billing, etc.

As shown in FIGS. 1-5, when a call comes into switch 12, the call is identified by a DNIS which relates to the number dialed by caller 4, so that appropriate data generated by system 2, can be routed to the correct switch 12 to complete the call as will be explained in more detail hereinafter.

In another embodiment of the present invention, as illustrated in FIG. 6, an incoming caller identification record 70 is provided by switch 12, after switch 12 receives a call from caller 4. Caller identification record 70 contains a number of fields including but not limited to: number dialed by caller, preferred language, originating phone number of caller, caller service provider and feature code. Additionally, caller identification record 70 may contain a location of caller field dedicated to caller 4 location should some form of automated caller location system be in place, as pictured in FIGS. 2-5 showing location database 60.

The number dialed by caller field, as shown in FIG. 6, contains the number dialed by the caller and may be used to identify the originating switch location of the incoming call. Additionally, as discussed below, the numbered dialed may be used to access a specific language service based solely on the number dialed.

The preferred language code field, as illustrated in FIG. 6, contains information indicating the language preference of caller 4. System 2, and in particular switch 12, maintains the ability to translate many different dial strings into system 2. One possibility for determining the preferred language of caller 4 is to automatically route calls from a particular dialed number, for example NPA-555-1818, directly to, for example, Spanish speaking operators. The preferred language code field is used to route calls to primary call center 16 via switch 12 by way of incoming caller identification record 70. Language preferences may also be stored in customer database 18 for frequent callers 4 who have their preferences stored in system 2.

The originating phone number of the caller field, as illustrated in FIG. 6, holds the originating phone number of the caller 4. The caller service provider field conveys the service provider of caller 4. This field allows system 2 to identify the calling party's service provider 26 for use with various functions such as introduction prompts, advertising prompts, billing information, usage tracking, etc. One example of a use of this data is in connection with the targeted advertising closing prompt directed to callers 4 from a particular service provider 26.

The feature code field, as illustrated in FIG. 6, holds information that can be used to identify any special features associated with caller's 4 device. These features could include, but are not limited to: promotional rate plans, standard rate plans, bundled service plans, device capabilities and the like. For example, service provider 26 may offer unlimited directions assistance for a flat fee per month, or could offer services free for a promotional period.

Location of caller field, as illustrated in FIG. 6, maintains information on the location of caller 4 based on information provided to system 2 by location database 60. In the event caller 4 or caller's 4 service provider 26 does not provide a caller 4 with an automated means for determining caller 4 location, this field will remain blank until operator terminal 20 and agent application 19 fills it in later when caller 4 manually or verbally tells system 2 their location.

In one embodiment of the present invention location database 60, as illustrated in FIGS. 2-5, is connected to WAN 25 of system 2 via either a direct connection or via the Internet. Location database is also coupled to service provider 26 of caller 4. Location database is configured to generate a caller 4 location using any one (possibly more than one) commercially available methods.

For example, in one embodiment of the present invention location database 60 utilizes a location systems such as GPS or triangulation to pinpoint the location of the caller for use in ascertaining the proper directions to the caller identified destination, without requiring the caller to input any information on their own location. Additionally, location database 60 may be tied directly into the city/state directory of the direction database to reduce the time required to locate the proper direction information.

In another embodiment of the present invention, as illustrated in FIGS. 2-5 location database 60 of system 2 maintains the ability to rapidly determine the location of the caller without a caller providing any verbal information. Systems available currently having such technology include triangulation systems and Global Positioning System (GPS).

The triangulation system provides the exact location of the caller by testing the signal response time generated by caller's 4 cell phone from three separate cell towers. When a caller makes a call the signal is picked up at three separate towers. Based on the time it takes for the signal to reach the tower, the distances to the towers can be calculated, and using that information, the location of the call can be determined. Such a service can be provided to directions database by service provides 26, or by some third party service. Alternatively, directions database 60 can be maintained by system 2 directly providing its own triangulation capabilities. It should be noted that regardless of how the triangulation data is obtained by location database 60, the connection to system 2 and the ability to provide the exact location of caller 4 with little or no input from caller 4 is the most essential feature.

The GPS system utilizes a chip placed in either the cell phone or the cell phone battery which works in conjunction with the GPS satellites to pinpoint the location of the chip. Unlike the triangulation method which find the location of caller 4 from a signal sent from one of the three towers used in the triangulation, the GPS system uses the chip in either the phone or the battery to embed its location signal into the cell phone communication. The GPS information is then sent to location database 60 which uses GPS module 67 to decipher the GPS information.

It should be noted that although GPS and triangulation are discussed above as the methods by which location database 60 obtains the location of caller 4, this is in no way intended to limit the scope of the present invention. Any automated means by which location database 60 can obtain the location of caller 4 without caller 4 providing any information (for example if they do not know where they are) used in conjunction with an enhanced directory assistance system to provide directions is within the contemplation of the present invention. Likewise, although location database 60 is pictured outside of the physical architecture of system 2 this is no way intended to limit the scope of the present invention. Any provider which can supply the location information to location database 60 for use by system 2, whether it be outsourced, provided by service provider 26, provided by third party vendors, or provided by system 2 itself are all within the contemplation of the present invention.

The use of these automated location systems to populate location database 60 allows system 2 to better assess the location of the caller, particularly when the caller is lost, or when caller 4 is moving, as the destination is being processed. The information provided to system 2 by location database is integrated into the location of caller 4 location field of incoming caller identification record 70. This information is then used by agent application 19 and enhanced service direction module 21 to populate the necessary "starting from" direction information unless otherwise instructed.

In accordance with one embodiment of the present invention, location of caller 4 location field, as illustrated in FIG. 6, is populated by location database 60 as discussed above. The format of the information is based on the operation of database 60. For example, if the location database 60 operates on a GPS (Global Positioning System) system the information in caller 4 location field of caller identification record 70 is in the form of a GPS position. Regardless of the system employed by location database 60, the information contained in location of caller 4 field will be used by enhanced service direction module 21 to populate the "starting from" information, unless otherwise instructed.

Although only six fields are identified for incoming call identification record 70, as illustrated in FIG. 6, any number of fields that are used to provide system 2 with the necessary data to complete a call is within the contemplation of this invention.

In another embodiment of the present invention, the output from switch/VRU 12 preferably takes the form of a text-to-speech interface. This allows agent application 19 to pass the directions to the text-to-speech processor to read the directions to caller 4. This provides the advantage of automating the bulk of the time required to provide directions, thus freeing the customer service representative to take additional calls. Additionally, this allows caller 4, using the text-to-speech service, to spend as much time as they desire walking through the directions, by either selecting a read back rate or selecting a repeat function.

Call centers 16 and 16' are comprised of hardware and software which accept inbound calls from switches 12 and which distribute the calls to multiple operator terminals 20 using standard automatic call distribution (ACD) technology. Operator terminals 20 are configured to customer databases 18, enhanced services direction module 21, and directions and mapping database 15 so as to search for and retrieve directions new directions and/or retrieve old or stored directions.

Call center 16 and 16' can be comprised of one or more processors coupled together in a networked arrangement to accomplish these functions, and can be constructed using known computing technology such as using personal computers, mini or mainframe computing devices, routers, switches and the like. Because the arrangement and operation of call centers 16 and 16' are similar, discussion of primary call center 16 is understood to also describe primary call center 16'.

Computer telephony interface (CTI) 29 is disposed between call center 16 and operator terminal 20. CTI 29 is configured to route the data portion (incoming caller identification record) of an incoming caller 4 call, such as the number dialed by caller 4 and the originating phone number of caller 4 to operator terminal 20, while the voice portion of the call is transmitted directly between call center 16 and operator terminal 20. While not discussed here, it is contemplated within the context of this invention that the data portion of an incoming caller 4 call could be sent to operator terminal 20 using in-band signaling (i.e., with the voice path of the call) as well.

Operator terminal 20 can also be any known computing device capable of receiving and displaying data on its display, including but not limited to a personal computer, UNIX workstation and the like. Although it is preferred that a separate customer service representative telephone be implemented as part of system 2 and coupled to primary call center 16 for communicating with caller 4, operator terminal 20 is not limited to this arrangement. For example, operator terminal 20 can be arranged to contain an integrated telephone (as shown). In other words, any arrangement that allows a customer service representative to engage in oral communications with caller 4 is sufficient.

In addition, although only a single operator terminal 20 is shown, system 2 is not limited to this arrangement. It is contemplated that system 2 is comprised of multiple operator terminals 20 such that more than one customer service representative is available to accommodate the users of system 2. It should be noted that primary call center 16 and its communication with switches 12, and operator terminal 20 as well as the arrangement and communication between primary call center 16' and switches 12' can be implemented in accordance with the connectivity and communication techniques described in U.S. patent application Ser. No. 09/449,126, filed Nov. 24, 1999, the contents of which are incorporated herein by reference.

In an alternate embodiment of this invention it is contemplated that a caller 4 may interact with an agent using a non-voice method such as, but not limited to: Short Messaging Service (SMS), Wireless Application Protocol (WAP), live chat, and instant messaging as will be discussed below.

In another embodiment of the present invention, caller 4 may wish to access system 2 for mapping without entering the directions feature. In such case, customer services representatives at operator terminals 20 can instruct enhanced services direction module 21 to retrieve mapping only information, increasing system 2 response time.

Agent application 19 platform is used to operate operator terminals 20, customer database 18, enhanced services direction module 21 and directions and mapping database 15, and uses information from those modules to create directions packet 50.

In accordance with one embodiment of the present invention, as illustrated in FIG. 7, directions packet 50 may include but is not limited to the fields: originating phone number of caller field 54, directions/mapping field 56, advertising prompt code field 58 and traffic field 57. These fields are intended only as one example of the field format for directions packet 50, and are not intended to limit the scope of the present invention. Additional fields for use in directions packet 50, used to enable additional features in a similar enhanced directory assistance system 2 are within the contemplation of the present invention.

Originating phone number of the caller field 54, illustrated in FIG. 7, is used to assure that switch/VRU 12 delivers the directions, mapping information and/or traffic information to the appropriate caller 4. Directions/mapping field 56, as illustrated in FIG. 7, contain the directions and information produced by enhanced services direction module 21 of system 2. Direction/mapping field 56 includes the instructions for switch/VRU 12 to deliver the directions to caller 4.

Advertising prompt code field 58, as illustrated in FIG. 7, provides switch/VRU 12 with the information on which advertising prompt selected by advertising prompt module 27 should be retrieved from advertising prompt storage module 13 and delivered to caller 4. Traffic field 57, as illustrated in FIG. 7, informs switch/VRU 12 on the traffic information created by enhanced services direction module 21 and traffic database 45 that is to be delivered to caller 4.

Directions packet 50 is the packetized information which is created by system 2 in response to a directions request from caller 4. Directions packet 50 is created by agent application 19 using information created by and/or stored in the various modules of system 2. A detailed description of how the fields of directions packet 50 are populated is included below based around the modules used to populate the particular fields. Although, it should be understood that the principle function of system 2 to deliver directions to caller 4, is embodied in the creations and delivery of direction packet 50 to caller 4, this is in no way intended to limit the scope of the present invention. Any information delivery system used by a similar enhanced directory assistance system to deliver similar directions and related information to caller upon request is within the contemplation of the present invention.

Agent Application 19, which is the principle software used by system 2 for creating directions, not only supports the communications between the modules of system 2 but also prepares directions packet 50 that is sent to switch 12 to ultimately provide the requested directions or mapping information to caller 4.

To create directions packet 50, operator terminal 20 and agent application 19 require information to be retrieved from directions and mapping database 15, customer database 18 (in the event caller 4 is a regular customer with stored preferences), advertising module 27, advertising database 66 and information from enhanced services directions module 21. This data is used to populate the various fields of directions packet 50 as discussed in more detail below.

Agent application 19 is configured to run several interfaces on operator terminal 20 in order to provide system 2 with the functionality of providing directions. The first of the interfaces, is the interface to the front-end application. The primary front-end interface is an enhanced directory assistance system. From an enhanced directory assistance system perspective, the desire is for caller's 4 customer service representative to be able to access the direction's functionality in much the same way they access any other enhanced directory assistance system 2 features, via a simple combination of key strokes. When a customer service representative receives a call requesting directions, the agent will request the "From" and "To" menu, where locations are presented to the operator. By using the interface via an application protocol interface structure, the directions software can be accessed through other applications in the future.

In an alternative embodiment of the present invention, caller 4 has the ability to see the same menu as the customer service representative. In such a situation, caller 4 is afforded the same ability to enter "from" and "To" thus avoiding the need for a live operator. In such a configuration, caller 4 is prompted to enter the travel locations via SMS, voice recognition, WAP or any other means compatible with system 2.

The second application protocol interface in the design is to an address application. Some of the callers requesting directions will know the name, but not the exact address, of their destination. In cases such as this, the agent needs to determine the address of the destination and then use that to populate the "To" field for directions. This address application is preferably handled by enhanced directory assistance system 2, however, the design allows the flexibility to use other sources, such as directions and mapping database 15, for acquiring the destination address.

The third interface defined for this process is for mapping vendors. Here, the customer service representative takes the From/To data from the caller and enters it into agent application 19 on operator terminal 20. This application in turn passes that information to either enhanced services direction module 21 (if the mapping is being handled internally) or the mapping software vendor (not pictured) via the Internet or some other connectivity means, where it is processed. The mapping software either returns an error message (corresponding to such events as: address not found; multiple starting addresses found; etc.); or successfully finds the indicated locations and returns a map, directions, travel distance and a time estimate. Agent application 19 uses the information returned to verify that the correct location appears to have been returned, or to ask for additional information from the caller. An example of the interface used in this application is the Mapquest® data interface for use with their mapping software. The use of Mapquest mapping software is intended only as an example of a mapping software application however, the agent application 19 structure leaves open the option of using other mapping software, either internally or externally located.

Another interface defined for this process is to the output drivers. The object of this embodiment is to have the option to send directions to the caller via a number of different technologies. In addition to the Text-to-speech (TTS) delivery capabilities of switch/VRU 12 or VRU/ASR68, Short Message Service (SMS), Wireless Application Protocol (WAP), E-mail, Voice Mail and fax are all potential mechanisms for communicating directions to a caller. To utilize all of these functions the output from the agent application 19 can be translated into a standard format which can in turn be handed off to a number of different output drivers.

It should be noted that although agent application 19 and operator terminal 20 are depicted as being operated by an agent or customer service representative, that is in no way intended to limit the scope of the present invention. The use of automated operator terminals alone, or automated/and operator terminal combinations are also within the contemplation of the present invention.

In one embodiment of the present invention, as illustrated in FIGS. 1-5, Wide Area Network (WAN) 25 is configured to couple all operator terminals 20 to system 2 and 2'. This includes connections between geographic locations, such that operator terminals 20 located at a call center can connect with switches 12 at other remote locations. As noted earlier and to be discussed in more detail below, because primary call center 16 may route calls to remote operator terminals 20' it is necessary that those operator terminals 20' be able to communicate back to the originating switch 12 in order to send the directions to the appropriate caller 4. WAN 25 is configured to relay directions packet 50, described in more detail below, to the appropriate switch 12 in order to complete caller 4's call.

In one embodiment of the present invention, as illustrated in FIGS. 1-5, customer database 18 is coupled to agent application 19 and is configured to store information relating to callers 4. The information is organized in customer database 18 in a listing table 52A. The information stored in customer database 18 is used to assist enhanced services directions module 21 in processing the direction information as well as agent application 19 when creating directions packet 50, as discussed below. The information is also used for other purposes such as billing, promotions and other related material. A more complete description of the material stored in customer database 18 is found below in the description of listing table 52A.

In one embodiment of the present invention, customer database 18 stores a branded audio message associated with the service provider 26 of the caller 4 such that when caller 4 accesses system 2, the audio welcome message is retrieved by operator terminal 20 and played to the caller 4. In another embodiment of the present invention the audio welcome message may be retrieved and played on call center 16 or switch 12.

In one embodiment of the present invention, as illustrated in FIGS. 1-5, mapping and directions database 15 is coupled to enhanced service directions module 21 and configured to store direction information for access by caller 4 at a later time. When caller 4 calls system 2 for stored directions, enhanced services direction module 21 accesses the stored directions for use in populating the appropriate field in directions packet 50.

It should be noted that although mapping and directions database 15 are illustrated as coupled to enhanced services direction module 21, it is not intended to limit the scope of the present invention. For example, mapping and directions database 15 could alternatively (not shown) be coupled directly to agent application 19, switch 12, and/or customer database 18 such that a system 2 could provide caller 4 with an automated option to return to stored directions without slowing or interfering with the operations of enhanced services direction module 21. Any configuration for storing and accessing stored directions in a similar enhanced directory assistance system is within the contemplation of the present invention.

In one embodiment of the present invention, in addition to storing directions for individual callers 4, mapping and directions database 15 also stores geo-coded information regarding all destination locations for use by enhanced services directions module 21. Geo coding of the database allows the database to assign a location to each entry in the database. This location can be in the form of a lat/long, zip code, zip+4, or any method that allows the database to determine physical location and proximity to other locations. Directions and mapping database 15 maintains a listing of all destinations in a given area (such as the continental United States) and geo-codes each entry such that database 15 can produces locations of destinations for any place for use by enhanced serviced direction module 21.

In one embodiment of the present invention advertising database 66 is coupled to advertising prompt module 27 and configured to store advertising parameters for use in populating the appropriate fields in directions packet 50. The information is organized in advertiser location business module table 80

Mapping and directions database 15 (FIGS. 1-5), customer database 18 (FIGS. 1-5) and advertising database 66 (FIGS. 4 and 5) are preferably any known database systems which can be programmed to store all necessary information. For example customer database 18 may store any number of listings including but not limited to the following: wireline telephone directory listings, originating service provider 26 of caller 4 listings, and other listings such as providers of goods and services. Mapping and directions database 15 may store any number of listings including but not limited to the following: destination locations, street addresses, latitude/longitude coordinates for destinations, mapping information and route finding codes and stored directions. Advertising database 66 may support data fields including but not limited to: business type, business location and advertising parameters. Databases 15, 18 and 66 preferably support multiple database tables for a voluminous quantity of listings and multimedia data associated with each destination or caller.

Databases 15, 18 and 66 can be based on any known database software and any known database format. The hardware configuration of databases 15, 18 and 66 can be any hardware platform capable of supporting the quantity of callers 4 and entries in their respective database tables. As such, databases 15, 18 and 66 can be stored on any device capable of storing the information.

Those of ordinary skill in the art can appreciate that although databases 15, 18 and 66 are shown as single units, they are not limited to this configuration. Databases 15, 18 and 66 can be comprised of multiple hardware units, i.e., central processing units and/or storage devices such as CD-ROMs, hard disk drives, tape disk drives, etc. which can communicate with each other across a transmission link. In addition, while only specific tables and fields within databases 15, 18 and 66 are discussed in detail, the current invention does not limit the table schema in databases 15, 18 and 66. In accordance with one embodiment of the present invention each database in system 2 or system 2' such as databases 15, 18, and 66 and 15', 18' and 66' respectively store the same information. In an alternate embodiment, it is also contemplated that databases 15, 18 and 66 can take the form of a distributed database. For example, users who are primarily based on the west coast can be supported from a portion of database such as database 15', 18' or 66' located in California, while users primarily located on the east coast can access a portion of database such as database 15, 18 or 66 located in New York.

As illustrated in FIG. 8, a standard directions and mapping database table 72 is provided in mapping and directions database 15 for each destination served. Table 72 can be created from commercially available databases. In fact, in one embodiment of the present invention the function of directions and mapping database 15 which provide all known destinations to enhanced services direction module 21 may be outsourced to a third party vendor as discussed above. However, irrespective of where directions and mapping database table 72 is maintained, either in an internal mapping and directions database 15, by an external third party directions mapping vendor or on a common system 2 database which combines the functions of mapping and directions database 15, customer database 18 and advertising database 66, directions and mapping database table 72 outlines the basic fields necessary so as to provide enhanced services direction module 21 with the necessary information to create directions instructions for directions packet 50. Any such table which operates in conjunction with a similar enhanced directory assistance system is within the contemplation of the present invention.

Directions and mapping database table 72, as illustrated in FIG. 8, comprises several fields including but not limited to: name or identifier (such as sir name or business name), street address, city, state, zip code, zip code addition (four digits), country, geographic location or geo-coding (latitude/longitude) and mapping code. It should be noted that this list is simply illustrative of some of the fields that can be used by mapping and directions database 15 in directions and mapping database table 72 in order to organize the information contained therein in a searchable format, however this is in no way intended to limit the scope of the present invention. Various additional information, or possibly even less information may be required to operate system 2 depending upon the method utilized by enhanced services direction module 21 to create directions. Any fields useful in storing and organizing destinations in directions and mapping database table 72 that assist in the operation of any similar system 2 is within the contemplation of the present invention.

In another embodiment of the present invention, as illustrated in FIG. 9, listing table 52A represents the organizational structure of information stored in customer database 18 to store listings or information about each caller 4 and codes to access previously used directions for regular callers. Listing table 52A information includes, but is not limited to: the calling phone number field, name field, the directory listed name field, address field, defined locality field, company field, wireless carrier field, billing information field, special features code field, type of data field, data source field, NPA/NXX wireless field, device capability field, preferred destinations field, recent destinations field, alternate destinations field, wireline phone number field, e-mail address fields, rate plan field, license plate fields and other codes used by agent application 19 in System 2 to populate various fields of directions packet 50. Listing table 52A represents the primary caller 4 table in system 2 and includes any additional special instruction information listings including information for populating advertising prompt module 27.

The calling phone number field of listing table 52A, as illustrated in FIG. 9, identifies the phone number of caller 4, for example a cell phone or landline number. The name field represents the actual name of the subscriber or caller. The directory listed name field represents the chosen listing name for caller. For example, this field could hold caller's 4 real name, nickname or the chosen alias for caller 4. The home address fields of listing table 52A are contemplated to contain one or more addresses that contain one or more of the following fields: street address 1, street address 2, city, state, country, zip code and zip+4 address of the subscriber for caller 4.

The defined locality field, as illustrated in FIG. 9, identifies caller's 4 preferred locality or combination of localities. For example, the subscriber based in NYC with a New Jersey area code on his or her wireless device may elect to use NYC, New Jersey, NY Metro area or some other designation for location. This notation may be used in connection with advertising prompt module 27 to schedule certain location based advertisements.

The company field of listing table 52A, as illustrated in FIG. 9, identifies the company for which caller 4 works. The wireline phone number field identifies one or more wireline phone numbers of caller 4 associated with a physical location such as address provided in the address field. The E-mail address field identifies one or more email addresses of caller 4. The wireless carrier field of listing table 52A identifies the service provider 26 for caller 4. This information can be used in conjunction with the advertising prompt feature as well as billing and other related features.

The billing information field of listing table 52A, as illustrated in FIG. 9, contains information specific to caller 4 which will support the billing function. This field provides system 2 with the specific billing instructions for caller 4 including the service provider information as well as special service subscriptions. For example, caller 4 may elect to incur per use charges for directions or, alternatively, they may elect for a flat billing rate for directions/per month.

The type of data field of listing table 52A, as illustrated in FIG. 9, identifies the type of wireless device that is being listed in the caller listings table. This field is useful in determining the capabilities of a subscribing caller 4 as to how he or she can receive directions or advertisement prompts. System 2, knowing the capabilities of the various wireless apparatuses available on the market can adjust the format the directions are sent in so as to provide the best possible results to caller 4.

The data source field of listing table 52A, as illustrated in FIG. 9, identifies the data source from which caller 4 record listing originated. This field provides information to system 2 identifying the source of this listing such as an individual, a service provider or any other entity, for example a third party, that supplied the data contained in customer database 18, and can be used in conjunction with such features as the advertising prompt or with bonuses or incentives.

The NPA/NXX wireless field of listing table 52A, as illustrated in FIG. 9, identifies whether or not caller 4 is using a wireless device or landline device. This field is used to turn on and off certain features which may only be available to either wireless or land based phones. For example, as discussed above, this field may assist or even supplant the function of location database 60 in the event caller 4 calls from a landline, such that the "start location" for the directions can be automatically directed to enhanced services directions module 21. This is intended as only one example of how the NPA/NXX wireless field listing is used in conjunction with the operation of system 2, however it is no way intended to limit the scope of the present invention.

The recent destination field of listing table 52A, as illustrated in FIG. 9, is used to store the latest destinations for which caller 4 has requested directions from system 2. The alternate destination field of listing table 52A, as illustrated in FIG. 9, is used to store any alternate destinations or alternate route information concerning direction requested by caller 4 from system 2. The preferred destination field of listing table 52A, as illustrated in FIG. 9, is used to store destination information for frequently used destinations by caller 4. This may include commuting destinations (work), or other regularly visited locations. This feature of storing the preferred destinations is particularly useful in system 2 when used in conjunction with the traffic information, as discussed below. Each of the recent destination field, alternate destination field and preferred destination field each maintain destination information in sub-listing table, as illustrated in FIG. 10, which identifies the "To" and "From" information.

It is important to note that recent destination, alternate route and preferred destination fields in listing table 52A, as illustrated in FIG. 9, and as further elaborated in FIG. 10, do not store directions per se, but store destination information for use by enhanced services direction module 21 or codes to access stored directions saved in directions and mapping database 15.

The device capability field of listing table 52A identifies the capabilities of caller's 4 device. It is contemplated that these capabilities may include: SMS, WAP, iMode, etc., capabilities, in addition to standard voice capabilities.

The special features field of listing table 52A identifies any special requirements that caller 4 may require. This field is used when providing directions and when advertising prompt module 27 is selecting an appropriate advertising prompt for a caller 4. This field can be used to better tailor the directions and prompts to the special needs of caller 4, such as: Spanish speaking, hearing impaired etc. For example, if a caller 4 asks for directions and the special requirements field is populated with a Spanish speaking code, then advertising prompt module 27 will only use Spanish-speaking advertisers along the route. This field can either be populated automatically by way of use of specified dial string, as explained above, or by way of caller 4 specifically requesting the special requirements field to be used.

The license plate field of listing table 52A contains the license plate of the primary vehicle associated with the subscriber of caller 4. This information can be used to associate a subscriber with one or more vehicles in which they may be traveling.

Finally, the rate plan field of listing table 52A contains the rate plan of caller 4. This information is used to determine things such as if roaming charges will apply, if long distance charges will apply and the number of monthly minutes associated with the directions plan.

It should be noted that although customer database 18 maintains its stored information in listing tables 52A for regular callers 4, this in no way is intended to limit the scope of the present invention, particularly for first time, non-subscribing or infrequent callers. The same features allowed or provided to a regular caller 4 can also be provided to first time callers 4, for example, by spontaneously creating a listing for a new caller 4 in customer database 18, all of the features listed above including but not limited to special advertising fields, general advertising fields, and special services can be used. Any system which utilizes a database for both frequent callers 4 and first time callers 4 which operates in a similar manner is within the contemplation of the present invention.

It should be noted that although the field description as discussed above was for customer database 18, customer database 18' preferably operates with substantially similar field structure.

In one embodiment of the present invention, as illustrated in FIGS. 1-5, enhanced service direction module 21 provides system 2 with a means to send directions to a caller, by way of populating directions/mapping field 56 of directions packet 50, illustrated in FIG. 7. A directions unit is incorporated in the enhanced services directions module 21 used by agent application 19 running on operator terminal 20 and allows a customer service representative to retrieve directions and transmit them to caller 4. The directions feature in enhanced services directions module 21 may be a stand alone unit that is configured to calculate directions based on a starting and a destination address, or other criteria as currently known in the industry. In accordance with another embodiment of the invention, enhanced services direction module 21 may be connected via a communications channel, for example, Internet, to a remote directions calculating unit operated by a third party such as those available by MAPQUEST®

After the creation of the directions by enhanced service direction module 21, the direction information is sent to agent application 19 where the necessary codes are embedded into direction packet 50, which is turn sent to switch/VRU 12 such that switch 12 can provide caller 4 with the directions. Also, upon the creation of the directions, enhanced service direction module 21 also stores the directions in mapping and directions database 15 for future access by caller 4 in the event caller 4 is disconnected or is using directions for a long trip where it is impractical to stay connected for the entire trip. In such cases when caller 4 reconnects, enhanced service direction module 21 obtains the stored directions from mapping and directions database 15 instead of recalculating the directions from the beginning.

It should be noted that enhanced service direction module 21 can also support other functions (not shown) in addition to the direction producing capabilities. For example, restaurant reservations can be integrated into the enhanced service direction module 21 used by agent application 19 running on operator terminal 20 providing system 2 with the ability to secure reservations and provide recommendations for restaurants to caller 4. Reservation services are activated when a restaurant or other related service provider, such as a caterer, activates the reservations services at enhanced service direction module 21 of system 2. Ideally, these additional features are used in conjunction with businesses who have placed advertisement prompts in system 2, such that system 2 can use the information in advertising database 66 for these additional services as well, however, this is not required.

The reservations feature in enhanced service direction module 21 may be a stand alone unit that is configured to arrange reservations based on up-to-date information received from a participating restaurant, or other criteria as currently known in the industry. In accordance with another embodiment of the invention, enhanced service direction module 21 may be connected via a communications channel, for example, Internet, to a remote reservations service system operated by a third party.

Recommendations can be provided when a restaurant or a restaurant recommendation service, for example, decides to place its information in enhanced services directions module 21 within system 2.

In another example, movie ticket and schedule software can be incorporated into enhanced services directions module 21 used by agent application 19 running on operator terminal 20, providing system 2 with the ability to provide movie information and ticket purchasing. These services are activated when a movie theater, playhouse or other related business, or a movie information provider provides the information to system 2.

In another embodiment of the present invention, as illustrated in FIG. 3, system 2 may maintain a connection to a traffic vendor 43. Traffic vendor 43 is preferably a third party vendor which can provide system 2 with frequently updated traffic information in a compatible format with system 2 geo-coded listings (such as those pictured in table 72 of FIG. 8), stored in mapping and directions database 15. However this configuration is intended only as an example and is in no way intended to limit the scope of the present invention. Any form of traffic information supplied from outside sources or even from internal system 2 sources in the position of traffic vendor 43, for use in connection with a similar enhanced directory assistance system is within the contemplation of the present invention.

In another embodiment of the present invention, irrespective of which service provides the traffic information to system 2, the system stores traffic data in traffic database 45, as illustrated in FIG. 3. The information stored in this database is used by enhanced services direction module 21 to cross reference against the directions requested by caller 4, in order to provide traffic information along with the directions data. This information is embedded into traffic field 57 of direction packet 50 by enhanced service direction module 21.

It should be noted that the traffic services provided by traffic vendor 43, traffic database 45 and enhanced service direction module 21 of system 2 may be provided independent of the direction function. For example, if caller 4 wishes to request traffic information for their commute to work each day it is unlikely that they will need the directions portion of the information. As such, agent application 19 and enhanced service direction module 21, upon instructions from caller 4 can simply provide traffic information on a route provided by caller 4 or on a route determined from caller's 4 preferred destination field in listing table 52A. Any use of traffic vendor 43 and traffic database 45 in conjunction with a similar enhanced directory assistance system, regardless of directions provided is within the contemplation of the present invention.

In another embodiment of the present invention, as illustrated in FIG. 11, advertising location business module table 80 represents the organization of listings concerning advertisers in advertising database 66. The information contained in table 80 is used by advertising prompt module 27 and in conjunction with enhanced service direction module 21 in order to attach the proper advertising prompt to the directions provided by system 2 to caller 4. Although in the present embodiment, advertising location business module table 80 is stored in the database 66 this is in no way intended to limit the scope of the present invention. For example, advertising location business module table 80 could be located in a common physical database with listing table 52A. For the purposes of illustrating the salient features of the present invention advertising location business module table 80 is located within advertising database 66 however, any system which utilizes similar fields in a database for the purposes of targeting advertisement prompts to callers 4 placing in a directions request is within the contemplation of the present invention.

Advertising location business module table 80, as illustrated in FIG. 11, is comprised of several fields which allow advertising prompt module 27 to search advertising database 66 for the appropriate advertiser and accompanying advertising prompt (stored in advertising prompt storage module 13). These fields include but are not limited to: business name; street address; business type including SIC codes and custom codes; relationship status; location parameters including geographic location and specified route data; advertising parameters including but not limited to time of day, day of week, distance radius (geographic and by route) and customer type.

The business name field, as illustrated in FIG. 11, indicates the name of the advertiser's business. The address field includes the address for the advertising business, including fields for street 1, street 2, city, state, zip, zip+4, country and latitude/longitude. This field can be used to populate the advertising prompt with the business address to assist caller 4 in finding the location, and can also be used by enhanced service direction module 21 to populate the destination information in the directions creation process.

The business type field, as illustrated in FIG. 11, is subdivided into SIC code field and the custom code field. The SIC code field gives standard information about the business such that advertising prompt module 27, when searching advertising database 66, can locate businesses of a particular type in order to tailor a prompt to an individual caller 4, based on the destination to which caller 4 requested directions. For example, if caller 4 requests directions to a hardware store and advertising database 66 maintains other advertising hardware stores in close proximity to the requested store, advertising prompt module 27 may send an advertisement prompt in the directions alerting caller 4 to the existence of another hardware store in the area.

Operating similarly, custom business type field, as illustrated in FIG. 11, in advertising location business module table 80, is used by advertising prompt module 27 to deliver targeted advertising prompts in the directions requested by caller 4. However, unlike the SIC codes, custom codes allow advertisers to better manipulate when their prompt will be selected. For example, if caller 4 asks for a movie theater and a restaurant advertiser is located nearby, even though the industry is different the restaurant code could use a custom code so that their advertising prompt could be delivered even when caller 4 requests directions to other types of businesses.

It should be noted that although SIC codes and custom codes have been described for use in conjunction with advertising prompts this is in no way intended to limit the scope of the invention. Any enhanced directory assistance system which makes use of SIC codes and custom business type codes for use in advertising is within the contemplation of the present invention The relationship status field, as illustrated in FIG. 11, is used by advertising prompt module 27 of system 2 to maintain the status of the advertiser's account. For example, advertising prompt module 27 may choose to only deliver advertisements with directions from "active" advertisers.

The location parameters field, as illustrated in FIG. 11, include the two sub fields geographic location field and specified routes field. Advertising prompt module 27, as illustrated in FIGS. 1-5, uses the geographic location field of advertising location business module table 80 to determine if a given advertiser is located sufficiently proximate to given set of directions provided to caller 4 by system 2 such that this particular advertiser's advertising prompt should be added to the directions. Additionally, should caller 4 request directions to the advertiser based on the advertising prompt, the geographic location field could be used directly to populate the necessary information in enhanced services directions module 21.

The specified routes field, illustrated in FIG. 11, is used in a similar fashion as the geographic location field. The specified route field is used by advertising prompt module 27 in order to determine if a particular advertiser is located in sufficient proximity to caller 4 based on the directions provided by system 2. However, unlike the geographic location field, the specified route field is used by advertising prompt module 27 when the advertiser is actually located along the route provided in the directions by system 2 as opposed to simply using the physical location. Thus, if a particular advertiser is located along the route, caller 4 would not even be required to make additional movements in order to pass by or arrive at the advertiser's business.

Although, in the above described embodiment both the geographic location field and the specified route field are used principally by advertising prompt module 27, this is in no way intended to limit the scope of the present invention. Any enhanced directory assistance system utilizing similar business location fields for use in directions production and targeted advertising is within the contemplation of the present invention.

The advertising parameter fields, as illustrated in FIG. 11, include but are not limited to: the time of day field; day of the week field; distance radius field (based on either geographic location or preferred routes); and customer type field. In general, the advertising parameters fields are used by advertising prompt module 27 in order to better target advertisements to callers 4.

The time of day field, as illustrated in FIG. 11, is used by advertising prompt module 27 to place the proper advertising prompts based on the time of day. For example, a breakfast restaurant advertiser with information stored in advertising database 66, as illustrated in FIGS. 4 and 5, may wish that their prompts are only used between the hours of 7 am and 12 noon to callers 4 passing in proximity to their location. This is intended as only one example of how the time of day field can be used, however, it is within the contemplation of the present invention that numerous variations using the time of day field are available.

The day of the week field, as illustrated in FIG. 11, is similar in operation to the time of day field and is used by advertisers with listings in advertiser database 66 when they wish for their prompts to be issued to callers on certain days. For example, if the advertising breakfast restaurant discussed above is not open on Mondays, they may wish for the advertisement prompt only to be played Tuesday-Sunday.

The distance radius field, as illustrated in FIG. 11, is used by advertisers to determine how close a caller 4 needs to be passing by before their advertising prompt will be available to be played. For example, the advertising breakfast restaurant may only wish to advertise to caller 4 who request directions that pass within 5 miles of their location. Alternatively larger enterprises such as amusement parks, may wish to send their prompt to any caller 4 who is passing within 50 miles of their location. The distance radius field is comprised of two sub-fields: geographic location and specified routes.

This feature allows advertisers to better direct their prompts to callers 4 who may actually be interested in diverting away from their requested directions. This feature is particularly useful for smaller advertisers who may have limited advertising budgets, where the larger radius advertising coverage is presumably more expensive.

The customer type field, as illustrated in FIG. 11, allows the advertiser to target a particular type of caller 4. For example, customer type field may direct system 2 to only send a particular advertiser's prompts to males. Other designations can also be used such as age group, types of car caller 4 drives, types of directions caller 4 typically requests. The information about caller 4 can come from outside sources or it may be populated using the information in customer database 18 assuming caller 4 has listing there. The information can also be based on the incoming call dial string to the extent that system 2 can associate the number being dialed from with an individuals qualities.

In one embodiment of the present invention advertising prompt module 27 provides the advertising prompt identification data that will be included in a defined field such as Advertising prompt code field 58 of the directions packet 50 as shown in FIG. 7. As discussed previously, directions packet 50 prompts switch 12 with a command to activate the appropriate advertising prompt, stored in advertising prompt storage module 13. Advertising prompt module 27 functions in conjunction with agent application 19 to generate directions packet 50, from FIG. 7. Directions packet 50 presents information to switch 12 to generate an advertising prompt based on advertising prompt code field 58 of direction packet 50, which is recognized by switch 12.

It should be noted that although advertising prompt module 27 is illustrated in FIGS. 4 and 5 as a separate module, it is not intended to limit the scope of the present invention. For example, advertising prompt module 27 can either exist as a physically separate unit (as pictured) or it can exist as a functional module of Agent Application 19 software. Any advertising prompt module for use in delivering targeted advertising prompts in conjunction with an enhanced directory assistance system is within the contemplation of the present invention.

Figure 12:
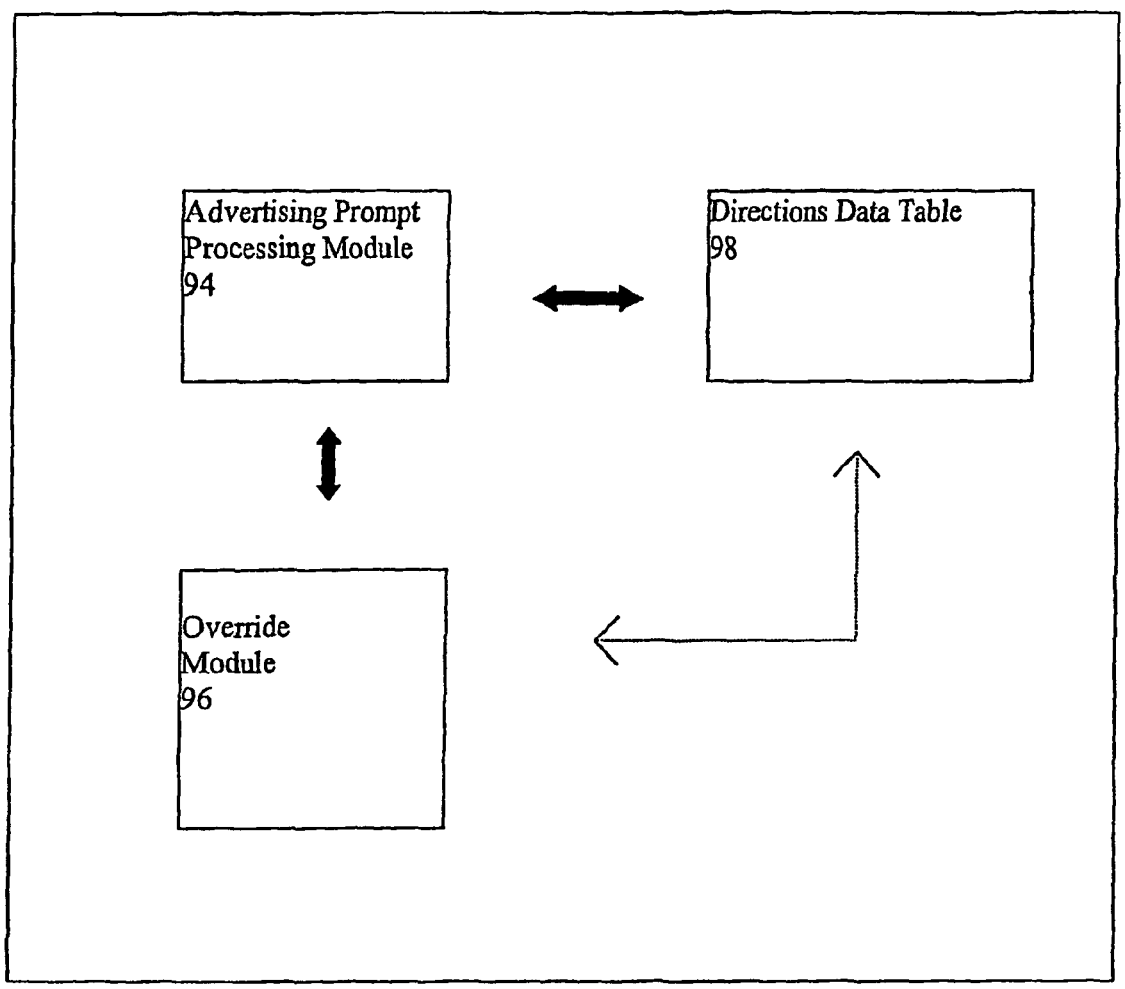
FIG. 12 illustrates the internal modules of an advertisement prompt module, in accordance with one embodiment of the present invention.

As illustrated in FIG. 12, advertising prompt module 27 comprises an advertising prompt processing module 94, override module 96 and a directions data table 98. In another embodiment of the current invention, advertising prompt processing module 94 and override module 96 reside on switch 12 or any combination of hardware and software such as: an ACD (Automatic Call Distribution), a PBX (Private Branch Exchange), a standalone VRU/ASR, application software and the like.

In another embodiment of the present invention, the invention contemplates that directions packet 50 can be used by any combination of hardware and software such as: an ACD, a PBX, a standalone VRU (Voice Response Unit)/ASR (Advanced Speech Recognition), application software and the like, to generate the advertising prompt based on the advertising prompt code field 58 in directions packet 50.

In order to appropriately populate the advertising prompt code field 58 of directions packet 50, as illustrated in FIG. 7, advertising prompt module 27, in conjunction with agent application 19, checks the retrieved listing in advertisement location business module listing 80 and/or advertising database 66, illustrated in FIG. 11. Advertising prompt module 27 uses the retrieved listing to populate some of the fields in directions data table 98. The remainder of the fields in directions data table 98 can be populated from advertisement database 66 and/or agent application 19 using information from other sources such as listing table 52A as stored in customer database 18, illustrated in FIG. 9.

In one embodiment of the current invention, directions data table 98 includes but is not limited to the five fields 60A-60E as shown in FIG. 13. Advertising prompt module 27 uses advertisement prompt processing module 94, override module 96 and advertising data table 98 to determine the appropriate information to populate advertisement prompt code field 58, and other fields of directions packet 50.

As illustrated in FIG. 13, these fields include: the number dialed by caller field 60A, types of data field 60B, directions requested field 60C, preferred language field 60D, and other data field 60E. These fields are populated by data contained in listing table 52A (FIG. 9) and/or customer database 18 (FIGS. 1-5), enhanced service direction module 21 (FIGS. 1-5), mapping and directions database 15 (FIGS. 1-5), advertising prompt module 27 (FIGS. 4-5), advertising database 66 (FIGS. 4-5) and from information contained in agent application 19 on operator terminal 20.

The number dialed by caller field 60A contains information that can be used by Advertising prompt module 27 to identify the number dialed by caller 4, service provider 26 of caller 4, the originating switch 12 and the directions call delivery area as defined by the NPA/NXX for this call. This information can be obtained by any of the sources which record the incoming caller 4 number such as listing table 52A of customer database 18 or incoming caller information listing 70.

The type of data field 60B informs advertising prompt module 27 of the type of directions and/or data that was solicited by caller 4, such as directions, traditional directory assistance, movies, restaurants, categories and/or other business searches. The information used to populate the type of data field 60B is obtained from various fields in listing table 52A and/or database 18 and from agent application 19.

Directions requested field 60C contains information used by advertising prompt module 27 which is used by advertising prompt processing module 94 to use as the cross-referencing information used to determine in caller 4 is passing within close proximity to one of the advertisers listed in advertiser database 66. The Information used to populate the directions requested field 60C is obtained by agent application 19 on operator terminal 20 or directly from enhanced service direction module 21.

Preferred language field 60D contains information used by advertising prompt module 27 to indicate the preferred language of caller 4. This information is used to ensure that the proper language closing prompts can be used. The data used to populate preferred language field 60D is obtained from either operator terminal 20, from the special services field of listing table 52A of customer database 18 or from any other modules described above which can determine the preferred language of a caller 4. One possible implementation would be to populate the preferred language field 60D based on the number dialed by caller 4, however, this is not the only possible implementation.

Lastly, the other information field 60E contains information used by advertising prompt module 27 to identify any additional information from such sources as listing table 52A of customer database 18, or advertising location business module table 80 of advertising database 66 that could be of use in selecting an advertising prompt.

Fields 60A-60E for advertising prompt module 27 are intended only to provide examples of possible fields and are in no way intended to limit the scope of the invention. Any field which can be used in advertising prompt module 27 to tailor an advertising prompt to allow for targeted third party advertising and other such uses is within the contemplation of the present invention.

While the current invention contemplates that advertising prompt module 27 may use any of the information in these fields and modules in any order, the following outlines one possible method of selecting an advertising prompt.

Figure 14:
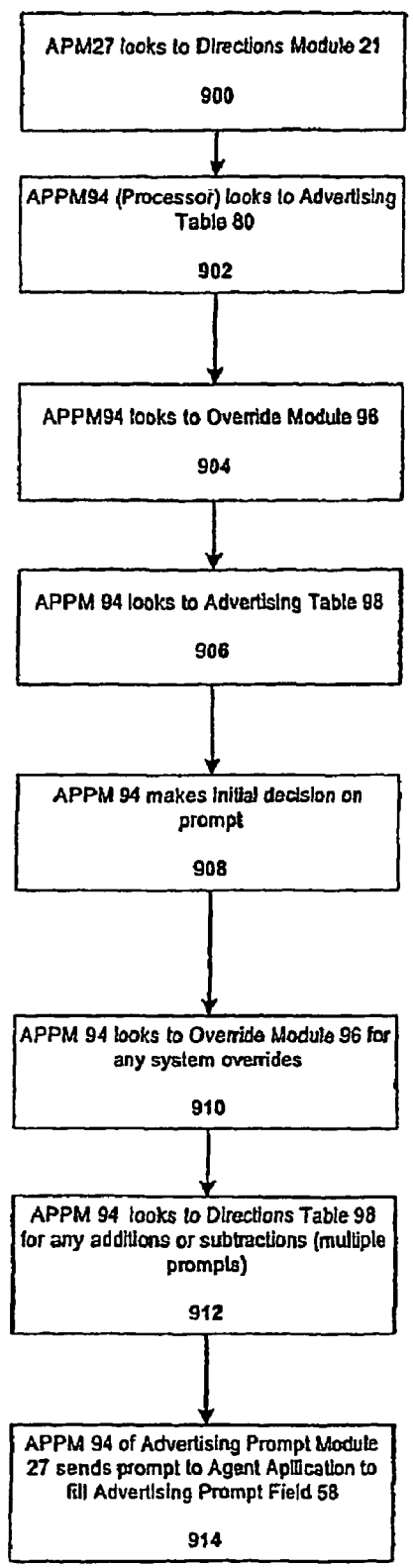
FIG. 14 illustrates a flow diagram of an advertisement prompt selection process, in accordance with one embodiment of the present invention.

As illustrated in FIG. 14, at step 900, advertising prompt module 27 looks at the directions information created by enhanced service direction module 21 to collect the necessary information to determine if the placement of an advertising prompt is appropriate for that particular caller 4. This is done based on the directions requested, caller 4 information from listing table 52A as stored in database 18, and advertisement information from advertisement location business module table 80 from advertising database 66. It is within the contemplation of the present invention that any additional information from any other available sources in system 2 such as incoming caller identification listing 70 as illustrated in FIG. 6, may also be used by advertising prompt module 27 to determine the appropriateness of an advertisement for a particular caller 4.

Next, at step 902, advertising prompt processing module 94 looks to the advertising location business module table 80 to cross reference caller 4 information against the advertising parameters to determine if any specific advertising prompts are active and appropriate for caller 4. If so, at least one advertising prompt code will be selected. If none of the advertisers fit the criteria for sending a prompt to caller 4, advertising prompt processing module 94 can either elect to not use a prompt at all or to use a prompt promoting system 2 itself such as new feature advertisements.

Next, at step 904, advertising prompt processor module 94 checks with override module 66 to determine if any advertising prompt override functions are present. The information for override module 96, comes from both listing table 52A of customer database 18 and from internal system 2 settings. For example, override module 96 may impose system 2 settings such as no advertising prompts between the hours of 3 am-4 am while the system updates. In these cases, even if advertising prompt processor module 94 determined that there was an appropriate advertising prompt, override module 96 would order the advertising prompt cancelled if caller 4 is contacting system 2 between the hours of 3 am and 4 am.

Another example of a function of override module 96 is to set default prompts based on the day. For example, recreational prompts may be set to activate only on weekends whereas business prompts may only activate on weekdays. Yet another feature of override module 96 is to cross-reference other services offered by system 2 during peak and off-peak hours. For example, on Saturday or Sunday; a cross-reference prompt to reservation services may be implemented when a caller 4 asks for restaurant information. Override module 96 may require advertising prompt processor module to further consult with advertiser location business module table 80 in the custom code field in order to properly cross reference service or alternatively the cross-referencing can be ordered by system 2 without any additional instructions from the advertiser.

It should be noted that the functions of override module 96 can be used to modify or augment advertising prompts. The complete breadth of examples of the functions of override module 96 are too numerous to fully illustrate, however, it should be noted than any ability to modify, add to, subtract from the advertising prompt codes based on information from table 80 are within the contemplation of this invention.

At step 906, advertisement prompt processor module 94 looks to directions data table 98 to determine an advertisement prompt based on the information fields contained therein.

Next, at step 908, advertising prompt processing module 94 of advertising prompt module 27 uses the agent application 19's logic to determine what information should be used to populate advertising prompt code field 58 of directions packet 50. One example of this logic is for advertising prompt module 27 first to look to the location or advertising parameters fields of advertising location business module table 80 of advertising database 66.

At step 910, advertising prompt processing module 94 looks to override module 96 to see if there are any additions, modifications, or other instructions that are added to or subtracted from the advertising prompts found in the advertising parameters fields described above. Next, at step 912, advertising prompt processing module 94 looks to directions data table 98 to see if there are any additions, modifications, or other instructions that are added to or subtracted from the advertising prompts decision made above. Finally, at step 914, upon selecting the appropriate advertising prompt, advertising prompt module 27 populates the advertising prompt field 58 of directions packet 50, as illustrate in FIG. 7.

It should be noted that, switch/VRU 12 can deliver directions with the advertising prompts stored in advertising prompt storage module 13 in various formats including but not limited to: Text-to-speech (TTS), Short Message Service (SMS), Wireless Application Protocol (WAP), E-mail, Voice Mail and facsimile. In the event caller 4 receives the directions in a format other than text-to-speech, the advertising prompt is defaulted to be in the same format.

Unlike prior art, this invention dynamically alters the advertising prompt to tailor a specific message to the caller 4 based on information obtained through the call. This decision can be based on specific caller 4 instructions, third party instructions, other information contained in listing table 52A of customer database 18, override module 96 and/or possible fields 60A-60E of directions data Table 98.

After the creation of the directions/mapping, traffic and/or advertising information based on the above described processes, in one embodiment of the present invention, agent application 19 software then creates directions packet 50. Alternatively, advertising prompt module 27 or some other application could create directions packet 50; however, for the purposes of this embodiment agent application 19 forms directions packet 50. As discussed above, and as illustrated in FIG. 7, directions packet 50 is comprised of multiple data fields. This can include but is not limited to the originating phone number of caller field 54, the direction mapping field 56, traffic field 57 and advertising prompt code field 58.

Direction packet 50 is formed by agent application 19 at operator terminal 20 using information from incoming caller identification listing 70 as illustrated in FIG. 6, listing table 52A of customer database 18, enhanced services direction module 21, advertising prompt module 27, and traffic database 45 as populated by traffic vendor 43. This information is then organized and used to populate the fields of directions packet 50.

The originating phone number field 54 is the originating phone number of caller 4. The directions mapping field 56 is the direction and mapping information requested by caller 4 for use by switch/VRU 12. This information is provided to operator terminal 20 by the enhanced service direction module 21. In the event system 2 is operating a traffic database 45, traffic field 57 is populated by enhanced service direction module 21 from information obtained from traffic database 45. Advertising prompt code field 58 of direction packet 50 contains instructions on which advertising prompt to retrieve, use and play for caller 4.

When combined, the originating phone number of caller field 54, the directions field 56, the traffic field 57 and the advertising prompt code field 58 contain all of the information needed to deliver the directions and traffic report as well as to deliver a relevant advertising prompt to caller 4.

Agent application 19, as supported by one of the operator terminals 20, communicates via operator terminals 20 to any one of the switches 12 with the combination of systems 2, 2' etc. via Wide Area Network 25 (WAN). WAN 25 allows customer service representatives at operator terminals 20 to transmit directions packet 50 from operator terminals 20 to any one of switches 12. In the event that agent application 19 is unable to successfully pass directions packet 50 due to any number of reasons including but not limited to the unavailability of WAN 25 or the rejection of directions packet 50, agent application 19 can initiate call completion using in-band signaling such as DTMF. This allows agent application 19 to put the caller on soft hold and pass the destination digits to switch 12 via the same trunk. Switch 12 then accepts the digits and releases the call to call center 16 and initiates directions delivery as described hereinafter.

Regarding signaling and trunking configurations, the communication links between switch 12 and primary call center 16 (or call center 16') and the communication links between switch 12 and Mobile Switching Center (MSC) 8 can be implemented as release link trunks. In this embodiment of the current invention the communication links are released once the directions data is transmitted to the destination end of the link. Release link trunk technology is known in the art and allows resources at the destination device to be freed by employing a predetermined signaling sequence which is recognized by the destination device as a release link signal. In addition, in another embodiment of the current invention, the communication links between switch 12 and mobile switching center (MSC) 8 can be implemented as Multi-frequency MF signaling. One possible example of MF signaling is Feature Group-D (FG-D) links as commonly known in the industry.

In an alternative embodiment of the current invention, the communication links between switch 12 and mobile switching center (MSC) 8 can be implemented as SS7. SS7 is a type of out-of-band signaling, as is commonly known in the industry. In another embodiment of the invention, the links between switch 12 and MSC 8 can be implemented as DTMF signaling. DTMF is a type of in-band signaling. All of these signaling choices are known in the art and are meant only as possible embodiments of the current invention but should not be seen as limiting the possible choice of communication links by which the current invention can be implemented. As part of the directions delivery process, switch 12 has the ability to select the optimal trunk group to be used for directions delivery to caller 4. For example, if switch 12 has a direct connection to the service provider 26 of caller 4, the completion of this call would be implemented over this link.

In the case where switch 12 did not have a direct connection to service provider 26 of caller 4, the direction delivery would be via the PSTN 10. This allows switch 12 to select the most cost effective means of delivering the directions to caller 4. Thus if a direct connection exists, then the first choice route for this call would be via that link. In the event that such direct connection is not available or does not exist, an alternate route such as a connection to the PSTN 10 could be used.

Directions Operations

Figure 15:
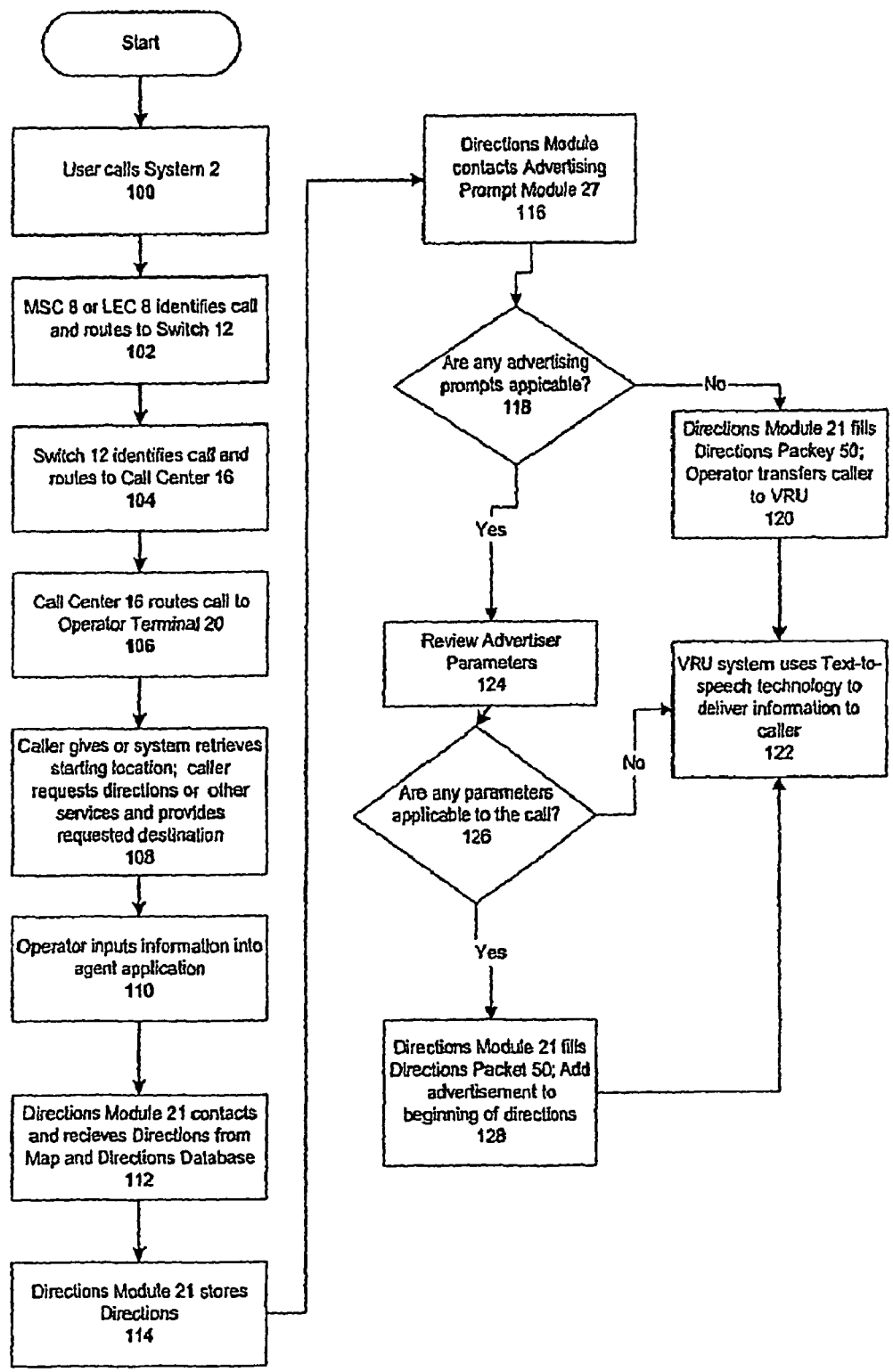
FIG. 15 illustrates a flow diagram of an enhanced directory assistance system directions procedure, in accordance with one embodiment of the present invention.
Figure 16:
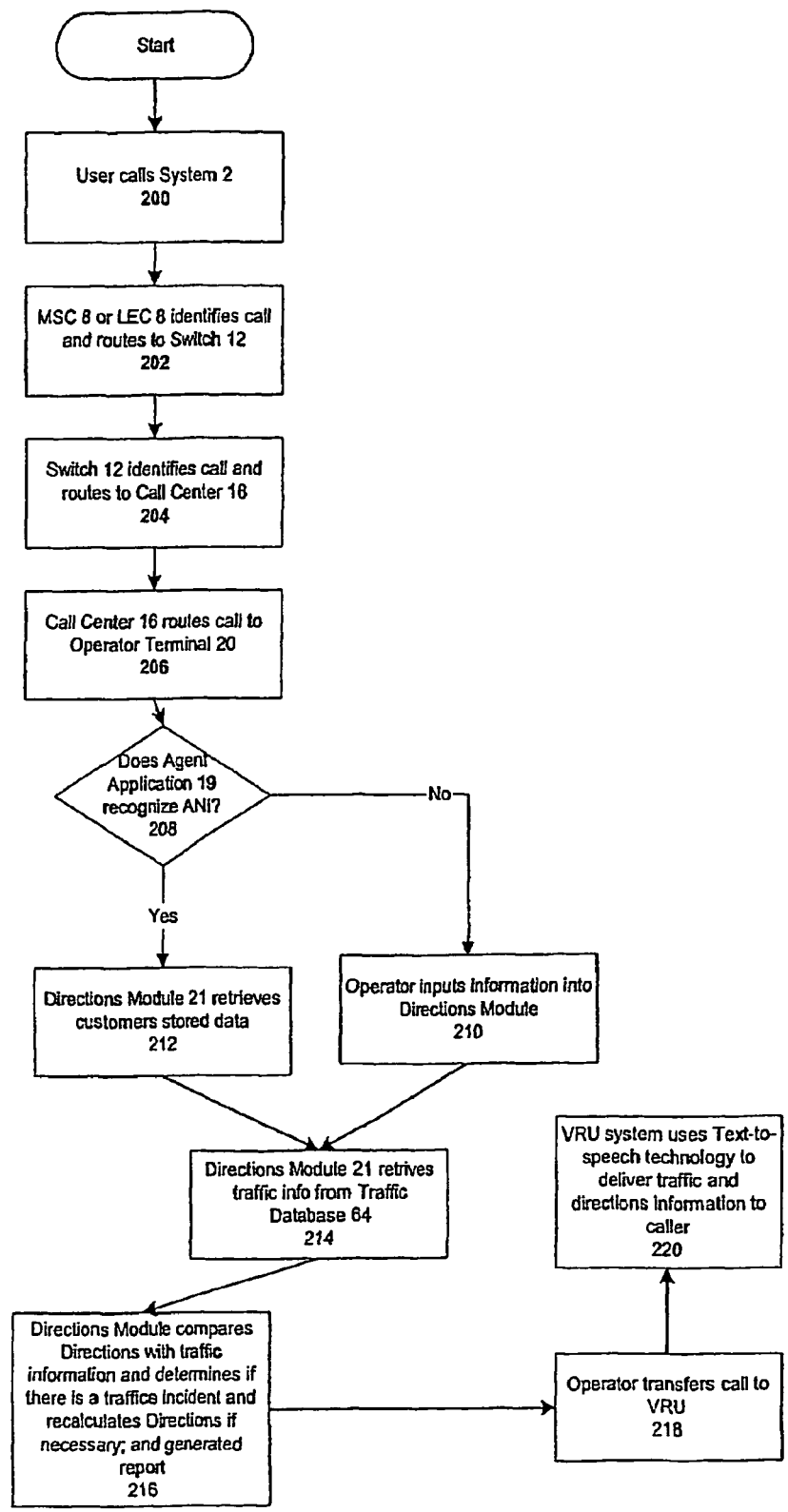
FIG. 16 illustrates a flow diagram of an enhanced directory assistance system directions procedure, in accordance with another embodiment of the present invention.

The functionality of the real time directions is explained in flow diagrams, FIGS. 15, 16 and 7. The functional design includes descriptions of how the proposed system handles: (1) caller 4 is calling specifically for directions, (2) caller 4 is calling for directory assistance and then asks for directions, (3) caller 4 is recalling directory assistance because they were disconnected while listening to directions, (4) caller 4 received incorrect directions and (5) caller 4 needs different or alternative directions. Each of these scenarios begins with the caller placing a directory assistance call, such as 411, 555-1212 or NPA-55-1212, and ends with the completion of the call. It should be noted that additional aspects such as special features including but not limited to traffic requests, closest to features, roadside assistance, and advertising functions will all be described in conjunction with basic direction requests however, in any of the above situations regarding directions, the special features of system 2 are available.

As illustrated in the flow diagram of FIG. 15, initially, at step 100, caller 4 calls system 2. The method for accessing System 2 can be via any known dialing pattern such as an "800" number, an NPA.nxx.xxxx number or NPA-555-xxxx, but also can be a shortened information-like number, such as "411," "555," "#555," etc. Preferably, access to system 2 is arranged such that the access number dialed by caller 4 is available nationwide such that caller 4 need not be concerned with individual access numbers depending on their location, or whether they are accessing system 2 via a wireless device or a wireline device.

At step 102, mobile switching center (MSC) 8 recognizes the pattern dialed by caller 4 as belonging to system 2 (i.e., a request for communication assistance) and routes the call to switch 12 along with the originating phone number of caller 4. Switch 12 tracks call detail information upon receiving the call from MSC 8.

Although not shown, the signaling methodology of the present invention can be implemented using the method and devices described in U.S. application Ser. No. 09/449,126, filed Nov. 24, 1999 the entirety of which is incorporated herein by reference.

An additional feature of switch 12 is its ability to recognize and translate dialed number strings allowing system 2 to provide agent application services to multiple customers. Upon dialing the appropriate number, MSC 8, is configured to recognize that the dialed number string belongs to the communication assistance system and method, and routes the inbound call to switch 12. If necessary, prior to routing the call to switch 12 MSC 8 may translate the user's dial string (for example #555) to a digit sequence recognized by system 2.

This translation allows different service carriers to access the service provided by the present invention using either a universal access number or different user dial strings. For example, in the event that two carriers decide to use different dial strings (i.e. cellular telephone carrier A may support access to system 2 by dial string *5 while cellular carrier B may access the service using the dial string 411), each carrier's mobile switching center (MSC) 8 may or may not select to translate this dial string before routing the call to switch 12. Upon receiving the inbound call, switch 12 may further translate the MSC 8 dial string and route the call to primary call center 16. The number sent by switch 12 allows system 2 to identify the particular MSC 8 from which the dial string was received along with the actual MSC dial string so that elements of system 2 can determine what service is desired, and where the inbound call originated. It is also contemplated by this invention that calls may originate from a wireline carrier as shown in FIG. 1. While not shown, it is also contemplated that calls may originate from a VoIP (Voice over Internet Protocol) carrier.

For example, switch 12 might translate mobile switching center (MSC) 8 dial string 411 to any four-digit number (this string length is for example only and can be modified) such as 9605. This four-digit string is used to populate the number dialed by caller field 60A in advertising data table 98 as shown in FIG. 13, as well as number dialed by caller 4 field in incoming caller identification record 70, illustrated in FIG. 6. The translated digit string will be referred to as the Direct Inbound Dial (DID) number. Each switch 12 can have multiple DID numbers to identify caller's 4 request for different services and their calling location.

An additional feature available using this technology is to provide a separate dial string as an indicator of preferred language information to system 2. For example, if a dial string such as NPA. 555.1818 is used, switch 12, after translating the MSC dial string, automatically sends a Spanish language preference indicator in incoming caller identification record 70 so that the primary call center 16 routes the call to an appropriate operator terminal 20, such as a Spanish speaking operator. Advantageously, Spanish speaking operators may be located remotely from system 2 and calls to be handled by them may be routed via call center 16 to a remote call center 16' as described above in reference with FIGS. 1-5.

It should be noted that the above example of call signaling methodology is intended only as an example of call routing and caller 4 identification and is not intended to limit the scope of the present invention. Any such signaling methodology protocol which is capable of transmitting the calf between MSC 8 and switch 12 is within the contemplation of the present invention.

At step 104, switch 12 routes the call to primary call center 16. To perform this task, switch 12 creates incoming caller identification record 70, as shown in FIG. 6, with the pertinent information as described in more detail above, and selects a direct trunk to call center 16. The configuration being used to carry the call between switch 12 and primary call center 16 preferably is a release link trunk configuration, discussed above in detail. While not discussed here, it is contemplated that any trunking and/or signaling configuration can be used to route the call from switch 12 to call center 16. It is also contemplated by this invention that switch 12 may connect this call to call center 16 via Public Switched Telephone Network PSTN 10 (i.e. using an 800 number or a directly dialed number).

Next, at step 106, upon receiving the call from caller 4, primary call center 16 notifies an available operator terminal 20 with the appropriate skills, if necessary, that an inbound request has arrived and routes the call there. Upon establishing a link between caller 4 and operator terminal 20, primary call center 16 establishes a voice and communications link from the caller to the customer service representative. The two-way voice communication is routed directly from caller 4 through primary call center 16 to operator terminal 20, having an attached telephonic communication means. The data communication, which may include any information contained in incoming caller identification record 70 (i.e. the number dialed by caller 4 (the DID), the preferred language code, the originating phone number of the caller and the caller service provider field) is transmitted to the primary call center 16 to operator terminal 20 via computer telephony interface (CTI) 29. CTI 29, deployed between primary call center 16 and operator terminals 20, is used to communicate the information necessary for the customer service representative and agent application 19 software to handle and complete the call.

Using this link, an agent asks caller 4 for information regarding the services they are requesting. Caller 4 supplies the necessary information. It is contemplated by the current invention that traditional directory assistance and enhanced wireless directory assistance may also be provided by system 2 in addition to the directions services described herein.

At step 108, agent application 19 determines if caller 4 ANI is recognized (i.e. based on a stored listing in listing table 52 of customer database 18). If there is a stored listing that information is made accessible to operator terminal 20, if not the customer service representative must take all of the information manually. In either case, at this step 108, the to and from information are entered into agent application 19 at operator terminal by customer service representative either manually as provided by caller 4 or by information contained in listing table 52A.

It should be noted here that if system 2 is running their automated location finder via location database 60 as described above, incoming caller identification record 70 will have an additional field which will provide operator terminal 20 with the exact location of caller 4 bypassing the need for caller 4 to provide the information verbally. This is particularly useful in the event caller 4 is lost and is unable to provide the "from" information.

Additionally, the feature of system 2 pinpointing a caller 4 location automatically, via location database 60, is particularly useful in a situation where caller 4 is contacting system 2 for directions from a mobile phone while in the process of driving. In such situations, caller 4 is not likely to know their exact location or what precise intersections they have passed. As such, system 2 utilizing the function of location database 60 will be able not only to obtain directions for caller 4 but will also be able to use their exact location so that caller 4 will not miss any important turn-offs or other directions. In fact, it is within the contemplation of the present invention, for system 2 to track caller 4 such that when caller 4 is using system 2 for long distance travel directions, system 2 will be able to calculate caller 4 progress and notify them of upcoming turns.

Also, it should be noted that in some events caller 4 does not know the "to" or destination information but rather only knows a name in which case the customer service representative can access system's 2 internal standard directory assistance databases (which may or may not be the same as the directions databases) in order to obtain the "to" information for the directions interface.

Additional features of system 2 are also employed at this stage including the "closest to" function. This service allows a caller 4 to contact system 2 and ask for the nearest store or type of service provider to their current location. For example, the caller could ask the location of the nearest food store, gas station, or major highway. This option would be of great value to people that travel. This feature also allows for cross-referencing with advertising prompt module 27 which can strategically embed advertisements into the directions based on the advertiser's proximity to the direction route given as discussed in more detail below at step 118.

Another feature of system 2 is to provide the personal traffic information. This service uses preferred destination field of listing table 52A that includes the individual's "normal" commuting start and destination. When callers 4 contacts system 2, based on their current location and normal commuting route, they are able to obtain an indication of any traffic problems in their path, and be provided with an alternate route to their destination, if they do encounter problems. The details of producing and delivering the traffic information is discussed below.

Yet another special feature of system 2 is to provide roadside assistance services. In case of an emergency, this service uses the location of caller 4, particularly useful where system 2 is employing automatic location identification with location database 60, to identify the nearest tow truck company or other forms of assistance.

The above list of system 2 features is not intended to be exhaustive, but is merely intended to provide examples.

Next, at step 110, the customer service representative enters or acknowledges the "to" and "from" information in agent application 19, where the information is directed to enhanced services direction module 21.

Next, at step 112, enhanced service direction module 21 accesses the information stored in direction and mapping database tables 72 in mapping and directions database 15 and creates a directions and mapping information for the desired location. These directions can be based solely on the information provided by the "to" and "from" information or it can be modified by caller 4's listing table 52A information if any was provided by agent application 19.

At step 114, enhanced services direction module 21 saves the directions in directions and mapping database 15 for a specified amount of time. It should be noted that the stored directions (for re-accessing by caller 4) need not be stored in mapping and directions database 15, but instead can be stored in any database in system 2 which has the ability to store the directions including but not limited to customer database 18 or enhanced services directions module 21 itself.

It should be noted that in addition to producing directions, enhanced service direction module 21 also produces traffic information, at this same stage if traffic vendor 43 and traffic database 45 are enabled in system 2. In fact, it is possible at this stage that enhanced service direction module 21 will only produce traffic information in the event that caller 4 has solely requested traffic information for a regular commuting destination.

Next, at step 116, the enhanced service direction module 21 contacts advertising prompt module 27 to determine if any advertisement prompts are appropriate for caller 4.

At step 118, advertising prompt module 27 searches the fields advertising location business module table 80 of advertising database 66 for advertising prompts that are appropriate for caller 4. For example, advertisement prompt module 27 searches the advertisement parameters field of advertiser location business module table 80 to determine if it is the appropriate time of day, day of the week, etc. Additionally, advertisement prompt module 27 also searches the radius field to determine is the advertiser's businesses are proximate enough to the directions in order for the advertising prompt to be activated. Advertising prompt processing module 94 ultimately assembles a list of advertising prompts stored in advertising prompt storage module13 which are applicable to the particular set of directions requested by caller 4. A more detailed description of the selection process is included previously in the description of the advertising prompt module 27.

If no advertising prompts are found to be applicable then system 2 proceeds to step 120 where enhanced service direction module 21 transfers the directions and/or mapping information and/or traffic information back to agent application 19 on operator terminal 20 such that agent application can fill the necessary fields of directions packet 50.

At step 122, operator terminal relays directions packet 50 to switch/VRU 12 which in turn converts and delivers the directions, traffic information or mapping information, or any combination thereof to caller 4.

However, if advertising prompt module 27 does uncover at least one advertising prompt at stage 118, then system 2 progresses to step 124.

At step 124, advertising prompt module 27 produces a list of all the relevant prompts and reviews their applicability.

At step 126, system 2 decides on one or more prompts to be added to the directions information. This decision can be made in several ways. One way for the decision to be made is for advertising prompt processor module 94 to make the decision based on random selection or based on priority codes stored in advertiser location business module table 80. Alternatively, the prompts could be selected based on least used cycle such that the longer it has been since a particular prompt has been used the more likely it will be used next.

The decision on which prompt to be used can also be done at operator terminal 20 by agent application 19 using similar programs described above or the selection can be made manually by the customer service representative.

It should be noted that if caller 4 requests a "closest to" function, such as directions to the closest gas station, agent application 19 will provide to customer service representative not only all of the nearest gas stations from the general mapping and directions database 15 but also all of the advertising gas stations stored in advertising database 66, presumably with some overlap. In this instance the advertising gas stations may be highlighted such that when agent application 19 or customer service representative ultimately populates the fields in direction packet 50, preference on the "closest to" information can go to paying advertisers with system 2.

If no applicable prompts are uncovered at step 126, the call proceeds to 122. However, assuming an applicable prompt is found, at step 128, regardless of the method used to select the advertising prompt, once enhanced services directions module receives/creates the directions, mapping information, traffic information and/or advertising prompt information, enhanced service direction module 21 proceeds to step 122 and sends the information to agent application 19 at operator terminal 20 for the creation of directions packet 50.

In another embodiment of the present invention, as illustrated in alternative flow diagram 16, caller 4 can specifically call for directions for a preferred destinations such a work or commuter destination. In this event certain steps are bypassed to hasten the process of providing the information to caller 4.

Steps 200, 202, 204, and 206 mirror steps 100, 102, 104 and 106 respectively however, at step 208 when caller 4 requests their commuter traffic report (either manually with customer service representative or by way of an automated number/keypad response) the call is transferred directly to the agent application 19 to determine if the ANI of caller 4 is recognized from listing table 52A. If not, at step 210, caller 4 is directed to customer service representative at operator terminal 20 to enter the "to" and "from" information manually and possibly to create an entry for that caller 4 in listing table 52A for future purposes.

If agent application 19 does recognize the ANI of caller 4 from listing table 52A, then at step 212 agent application retrieves the preferred destination information from the preferred destination field. This information is sent directly to the enhanced service direction module 21. Regardless of recognition of the ANI of caller 4, at step 214, enhanced service direction module 21 retrieves the traffic information from traffic database 45 for the caller designated route. If requested, enhanced service direction module 21 can also prepare directions, or provide an advertising prompt (from advertising prompt module 27) at this point as well.

At step 216, enhanced service direction module 21 compares the directions produced to the traffic information. If there are any instances of traffic situations along the computed path, the enhanced direction module 21 will attempt to recompute the directions such that the traffic incident is avoided. At step 218 the information provided is entered into direction packet 50 by agent application and delivered to switch/VRU 12. And at step 220 switch 12 delivers the traffic information to caller 4.

Figure 17:
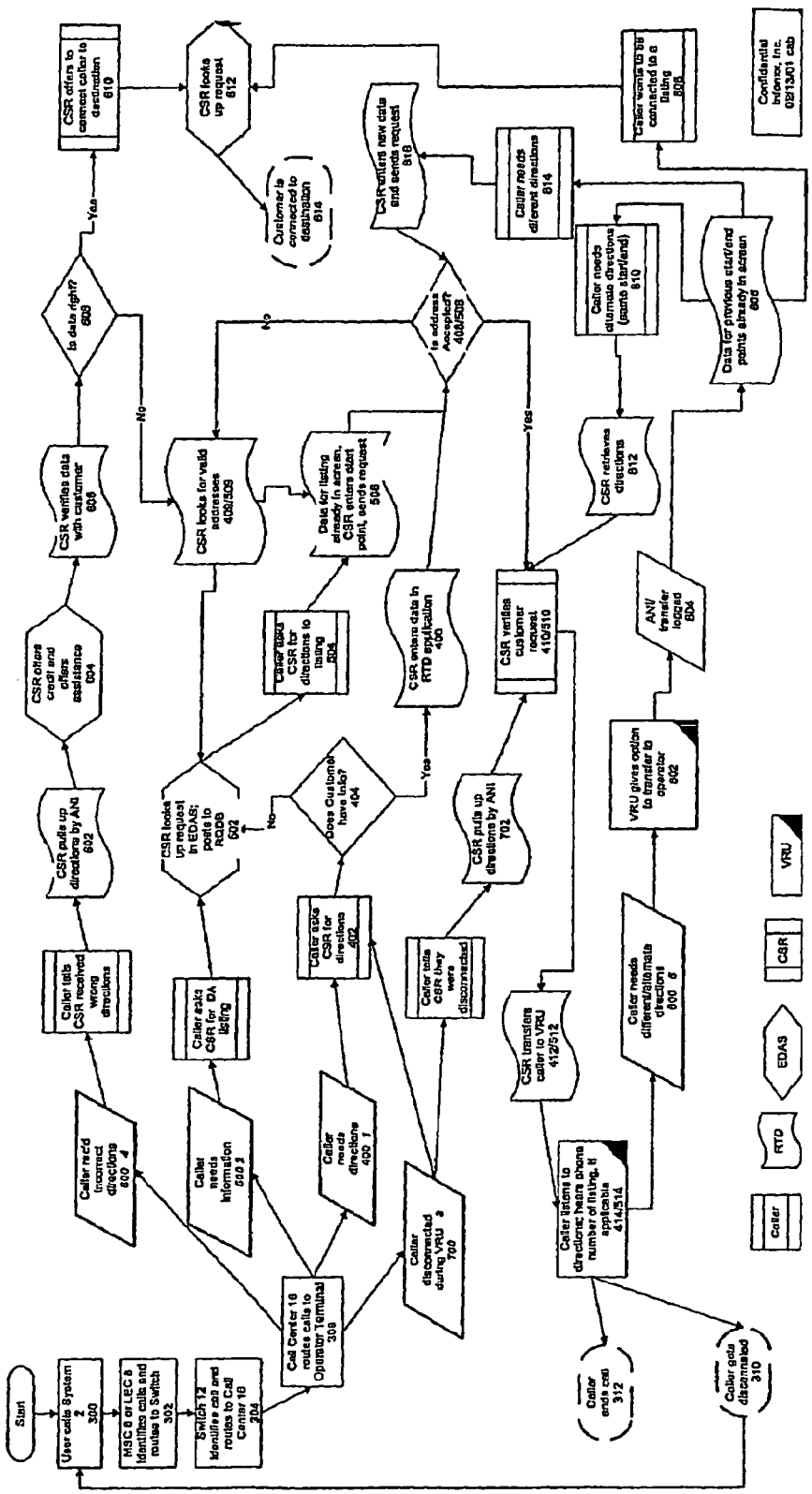
FIG. 17 illustrates a flow diagram of an enhanced directory assistance system directions procedure, in accordance with another embodiment of the present invention.

In another embodiment of the present invention, as illustrated in dynamic integrated FIG. 17, system 2 is shown provided in the enhanced directory assistance services. These services not only include the directions but also include standard directory assistance functions such as looking up telephone numbers. Also, in the area of direction dispensing, errors may cause caller 4 to be disconnected from system 2, for caller 4 to seek alternate directions or for caller 4 to receive incorrect directions. Each of these issues can be handled by system 2 in a dynamic cross-function manner, illustrated in FIG. 17 which shows the flow of call to system 2 where the options to caller 4 are open to all of the full functions of enhanced directory assistance system 2. However due to the complexity of the diagram in FIG. 17 the steps will be illustrated in simple format. It is presumed that all of the features and modules will operate in the same manners as described above.

Steps 300, 302, 304 and 306 mirror steps 100, 102, 104 and 106. At step 306 call center 16 routes the call to operator terminal 20. At this point caller 4 is presented with several options described below in subroutines 400, 500, 600, 700, and 800.

If caller 4 selects caller requests directions subroutine 400, then the call is routed to customer service representative at operator terminal 20. At step 402 the location of caller 4 information is retrieved using any one of the above described methods. At step 404, caller 4 is requested to state their destination. If they do not know the destination but only a name or a phone number they are directed to step 502 in subroutine 500. If caller 4 knows the destination at step 406 the customer service representative enters it into agent application 19.

At step 408, system 2 determines if the address entered is accepted. If not, the system proceeds to step 409 where the customer service representative looks for a valid address (from which the call either progresses to 408 if an new address is found or to step 502 if no new address is found) If the address is accepted the call progresses to step 410 where the customer service representative verifies the request.

Next at step 412, the call (i.e. directions packet) is transferred to the switch/VRU 12. And at step 414 the directions are delivered and the call is terminated. (Unless caller 4 requests alternate directions under subroutine 800 discussed below.)

If caller 4 initially calls system 2 for standard directory assistance but then asks for directions to that location subroutine 500 is followed. At step 502, the customer service representative looks up the number of the requested listing from a database is system 2. At step 504 the caller requests directions to that location. At step 506, the data for the destination already on the screen is combined with the starting point information provided by one of the above described methods.

From there subroutine 500 mirrors subroutine 400. Specifically, steps 508, 509, 510, 512 and 514 all mirror steps 408, 409, 410, 412, and 414 respectively.

If caller 4 contacts system 2 and at step 306 informs customer service representative that the directions received previously were incorrect the call enters subroutine 600. At step 602 the customer service representative pulls up the directions that were issued to caller 4 from mapping and direction database 15 (or which ever database is being used by system 2 under any alternate database structure) based on caller's 4 ANI. At step 604, the customer service representative offers caller 4 a refund and additional assistance.

Next, at step 606, customer service representative verifies the data with caller 4. At step 608, customer service representative checks the data with system 2. If the information is incorrect the call is directed to steps 409/509 in the other subroutines. However, if the directions were correct but caller 4 made a mistake in following them, the call proceeds to step 610 where customer service representative informs caller 4 that the directions were correct. At step 612, if caller 4 wishes to be connected by telephone to the destination, the customer service representative retrieves the phone number of the destination and at step 614 caller 4 is connected to the destination.

If caller 4 contacts system 2 and at step 306 informs customer service representative (or presses the desired automatic bypasses described above) that the call was disconnected (either on purposes on long trips or by accident or loss of cell signal) the call enters subroutine 700. At step 702 the customer service representative or VRU/ASR pulls up the stored directions from mapping and directions database 15. Form there, the call is directed to steps 410/510 of the previous subroutines.

As such, the endpoint of subroutines 400, 500, 600 and 700 all end with caller 4 attached to switch 12, receiving the requested directions (at either step 414/514). However at intermediate step 310, if caller 4 is cut off or disconnects for any reason but needs to reconnect to system 2, caller 4 is directed to step 300. It is noted that in an alternative embodiment re-connection to saved directions can be accomplished through several means. For example, caller 4 can re-connect via a customer service representative or, alternatively, a caller can use an access code such as "#4" to directly connect to switch/VRU 12 which maintains a function that returns caller 4 directly to their saved directions.

If caller 4 is satisfied with directions, at step 312 they disconnect from system 2.

In another embodiment of the present invention, if caller 4 receives the directions but wishes to access an alternate route the call leaves step 414/514 and enters subroutine 800. At step 802, switch/VRU 12 gives caller 4 the option to transfer back to operator terminal 20 and customer service representative. At step 804, the ANI transfer is logged with system 2.

Next, at step 806, the customer service representative is presented with the previous start/end points on operator terminal 20. Caller 4 is then presented with three options: 1) caller wishes to connect telephonically with their destination (step 808), 2) caller requests alternate directions to the same start/stop point (step 810) or 3) caller wishes for directions from new start/stop point (step 814).

If caller 4 chooses step 808 to connect telephonically, the call proceeds to step 612 of the 600 subroutine. If caller 4 chooses step 810 to get alternate directions, the call proceeds to step 812 where the customer service representative retrieves the alternate directions produced by enhanced service direction module 21. From there the call is connected to step 410 for completion. If caller 4 chooses step 814, the call proceeds to step 816 where the customer service representative enters the new stop/start data into agent application 19. From there the call is directed to step 408 from subroutine 400.

It should be noted that this dynamic example of how system 2 operates is intended only as one example of a possible method of interaction between the various functions of system 2. In particular, it should be appreciated that customer service representative can be replaced throughout by either automated operator terminals 20 or keypad responses. However, any similar enhanced directory assistance system using similar modules and a similar system of operation is within the contemplation of the present invention.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method for providing directory assistance at a directory assistance system, said method comprising the steps of:
   receiving at a communication interface at least one incoming communication from at least one requester, said communication including a request for a contact information and;
   retrieving from a database and delivering said requested contact information to said requester in response to said request; and
   retrieving from a database a plurality of advertising prompts each meeting a selection criteria related to said contact information and delivering at least one advertising prompt to said requester, wherein said advertising prompt is for a listing other than said requested contact information and from an industry other than the industry associated with said contact information and wherein the selection of one advertising prompt among said plurality of prompts is based on the amount of time since said one advertising prompt was last played to a requester.

2. The method of providing directory assistance as claimed in claim 1, wherein said incoming communication is received in a format selected from the group consisting of SMS (Short Message Service), WAP (Wireless Application Protocol), IM (Instant Message) and live chat.

3. The method of providing directory assistance as claimed in claim 1, wherein said advertising prompt is delivered to said requester in a format selected from the group consisting of TTS (Text-To-Speech); SMS (Short Message Service), WAP (Wireless Application Protocol), e-mail, voice mail and facsimile.

4. The method of providing directory assistance as claimed in claim 1, wherein said advertising prompt may be configured so that it is delivered to requesters only during a certain time of day.

5. The method of providing directory assistance as claimed in claim 1, wherein said advertising prompt may be configured so that it is delivered to requesters only during a certain day of the week.

6. The method of providing directory assistance as claimed in claim 1, further comprising the step of compiling information related to said requester and wherein said advertising prompt is selected based on information contained in said compiled information.

7. The method of providing directory assistance as claimed in claim 1, further comprising the step of providing directions to said requester to a location of said contact information.

8. The method of providing directory assistance as claimed in claim 7, wherein said advertisement prompt delivered to said requester is within geographic proximity to a route for said directions provided to said requester.

9. The method of providing directory assistance as claimed in claim 8, wherein the range of geographic proximity to said route before an advertising prompt may be delivered to a requester may be varied for each of said advertising prompts.

10. The method of providing directory assistance as claimed in claim 1, wherein the geographic location of the requester is known based on an auto-location system.

11. The method of providing directory assistance as claimed in claim 10, wherein said request for contact information is for a particular category of contact information closest to said requester.

12. The method of providing directory assistance as claimed in claim 1, wherein said advertising prompt is for a commercial service offered by a directory assistance system providing said directory assistance.

13. The method of providing directory assistance as claimed in claim 1, further comprising the step of retrieving and delivering a second advertising prompt to said requester.

14. The method of providing directory assistance as claimed in claim 1, wherein said advertising prompts are stored remotely from a directory assistance system providing said directory assistance.

15. A method for providing directory assistance at a directory assistance service, said method comprising the steps of:
receiving at a communication interface at least one incoming communication from at least one requester, said communication including a request for a contact information;
retrieving from a database and delivering said requested contact information to said requester in response to said request;
providing directions from a database to said requester to a location of said contact information; and
retrieving from a database a plurality of advertising prompts each meeting a selection criteria related to said contact information and delivering at least one advertising prompt to said requester, wherein said advertising prompt is within geographic proximity to a route for said directions provided to said requester,
wherein the selection of one advertising prompt among said plurality of prompts is based on the amount of time since said one advertising prompt was last played to a requester.

16. The method of providing directory assistance as claimed in claim 15, wherein the range of geographic proximity to said route before an advertising prompt may be delivered to a requester may be varied for each of said advertising prompts.

17. The method of providing directory assistance as claimed in claim 15, wherein the geographic location of the requester is known based on an auto-location system so as to populate a starting point for said directions.

18. The method of providing directory assistance as claimed in claim 17, wherein said request for contact information is for a particular category of contact information closest to said requester.

19. The method of providing directory assistance as claimed in claim 15, wherein said incoming communication is received in a format selected from the group consisting of SMS (Short Message Service), WAP (Wireless Application Protocol), IM (Instant Message) and live chat.

20. The method of providing directory assistance as claimed in claim 15, wherein said advertising prompt is delivered to said requester in a format selected from the group consisting of TTS (Text-To-Speech); SMS (Short Message Service), WAP (Wireless Application Protocol), e-mail, voice mail and facsimile.

* * * * *